(12) United States Patent
Grassi et al.

(10) Patent No.: US 11,001,917 B2
(45) Date of Patent: *May 11, 2021

(54) ABLATION CASTING PROCESS

(71) Applicant: Alotech Limited, LLC, Brooklyn, OH (US)

(72) Inventors: John Grassi, Peachtree, GA (US); Michael J. Grassi, Columbus, OH (US); John Campbell, Ledbury (GB)

(73) Assignee: Alotech Limited, LLC, Brooklyn, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/799,333

(22) Filed: Feb. 24, 2020

(65) Prior Publication Data
US 2020/0190646 A1 Jun. 18, 2020

Related U.S. Application Data

(63) Continuation of application No. 15/581,922, filed on Apr. 28, 2017, now Pat. No. 10,612,114.
(Continued)

(51) Int. Cl.
*B22C 1/16* (2006.01)
*B22D 21/00* (2006.01)
(Continued)

(52) U.S. Cl.
CPC .................. *C22F 1/04* (2013.01); *B22C 1/16* (2013.01); *B22D 21/007* (2013.01); *B22D 25/02* (2013.01);
(Continued)

(58) Field of Classification Search
CPC ...... B22D 21/00; B22D 21/007; B22D 25/02; B22D 25/06; B22D 27/04; B22D 29/00;
(Continued)

(56) References Cited

U.S. PATENT DOCUMENTS

| 4,644,996 A | 2/1987 | Kawai et al. |
| 5,647,426 A | 7/1997 | Prieto et al. |

(Continued)

FOREIGN PATENT DOCUMENTS

| CN | 201102061 Y | 8/2008 |
| CN | 102259170 A | 11/2011 |

(Continued)

OTHER PUBLICATIONS

Bhardwaj et al., ""Permanent Mold Casting" Excellent Casting Method for Manufacture of Automotive Components", International Journal on Recent and Innovation Trends in Computing and Communication, vol. 2, Issue 8, Aug. 2014, p. 2254-2255.
(Continued)

*Primary Examiner* — Kevin P Kerns
(74) *Attorney, Agent, or Firm* — Fay Sharpe LLP

(57) ABSTRACT

A process for the manufacture of metal products includes the steps of providing a mold including a first portion made of an aggregate and a binder, delivering a molten metal into the mold, removing a first portion of the mold with a fluid and solidifying at least one targeted portion of the molten metal which will form the metal product with the fluid. A flow of fluid to the mold is stopped for a period of time. Subsequently, a remaining portion of the molten metal is solidified to form the metal product. The at least one targeted portion of the metal product has better mechanical properties than does a remaining portion of the metal product. A unitary, one-piece aluminum alloy component with differing mechanical properties is also disclosed.

22 Claims, 10 Drawing Sheets

Related U.S. Application Data

(60) Provisional application No. 62/328,849, filed on Apr. 28, 2016.

(51) Int. Cl.
    *B22D 25/06*     (2006.01)
    *B22D 29/00*     (2006.01)
    *C22F 1/04*     (2006.01)
    *B22D 25/02*     (2006.01)
    *B22D 27/04*     (2006.01)
    *B60B 3/10*     (2006.01)
    *B62K 25/28*     (2006.01)

(52) U.S. Cl.
    CPC ............ *B22D 25/06* (2013.01); *B22D 27/04* (2013.01); *B22D 29/00* (2013.01); *B60B 3/10* (2013.01); *B60B 2310/202* (2013.01); *B60B 2310/54* (2013.01); *B60B 2360/104* (2013.01); *B62K 25/28* (2013.01)

(58) Field of Classification Search
    CPC ......... B22C 1/16; B60B 3/10; B60B 2310/54; B60B 2310/202; B60B 2360/104; B62K 25/28; C22F 1/04
    USPC ................................. 164/122, 131
    See application file for complete search history.

(56) References Cited

U.S. PATENT DOCUMENTS

| | | | |
|---|---|---|---|
| 5,829,137 | A | 11/1998 | Grassi |
| 7,121,318 | B2 | 10/2006 | Grassi et al. |
| 7,147,031 | B2 | 12/2006 | Grassi et al. |
| 7,165,600 | B2 | 1/2007 | Grassi et al. |
| 7,216,691 | B2 | 5/2007 | Grassi et al. |
| 8,651,167 | B1 | 2/2014 | Hasenbusch |
| 9,643,651 | B2 | 5/2017 | Dressel et al. |
| 10,612,114 | B2 * | 4/2020 | Grassi et al. ............. C22F 1/04 |
| 2004/0045698 | A1 | 3/2004 | Grassi et al. |
| 2004/0050524 | A1 | 3/2004 | Grassi et al. |
| 2004/0108088 | A1 | 6/2004 | Grassi et al. |
| 2005/0178521 | A1 | 8/2005 | Grassi et al. |
| 2006/0207742 | A1 | 9/2006 | Garza-Ondarza et al. |
| 2008/0041499 | A1 | 2/2008 | Grassi et al. |
| 2012/0180749 | A1 | 7/2012 | Kopchick et al. |
| 2014/0116638 | A1 | 5/2014 | Hasenbusch |
| 2017/0183038 | A1 | 6/2017 | Dressel et al. |

FOREIGN PATENT DOCUMENTS

| | | |
|---|---|---|
| EP | 1 691 944 B1 | 8/2006 |
| FR | 2 906 168 A3 | 3/2008 |
| JP | 57-109559 A | 7/1982 |
| JP | 62-118962 A | 5/1987 |
| JP | 2-037818 B2 | 8/1990 |
| JP | 10-005966 A | 1/1998 |
| JP | 2005-532169 A | 10/2005 |
| JP | 2006-504531 A | 2/2006 |
| JP | 2008-532773 A | 8/2008 |
| JP | 2009-255118 A | 11/2009 |
| PL | 222130 B1 | 7/2013 |
| WO | WO 2004/004948 A2 | 1/2004 |
| WO | WO 2004/014581 A2 | 2/2004 |
| WO | WO 2006/031954 A2 | 3/2006 |
| WO | WO 2006/129197 A2 | 12/2006 |
| WO | WO 2007/048250 A1 | 5/2007 |
| WO | WO 2008/021450 A1 | 2/2008 |
| WO | WO 2012/159898 A1 | 11/2012 |

OTHER PUBLICATIONS

Dudek P., et al., "Semi-Industrial Tests of Ablation Casting", Power Point Slide, Jul. 1, 2013.

Grassi et al., "The Ablation Casting Process", Materials Science Forum, vols. 618-619, 2009, pp. 591-594.

http://www.autoline.tv/daily/?p=41566#more-41566, "Ad #1822—China Not That Cheap Any More, Automated Braking to Be Standard, Honda's Innovative Manufacturing—Acura NSX's Ablation Casting", Mar. 2016, 3 pages and 2 pages of screen grabs from the foregoing website.

Jain et al., "Effect of Chill Size and Material on Temperature Gradient in Aluminum Alloys Casting", Journal of Material Science and Mechanical Engineering, vol. 1, No. 2, Oct.-Dec. 2014, pp. 106-112.

Pavlović-Krstić et al., "The Effect of Mould Temperature and Cooling Conditions on the Size of Secondary Dendrite Arm Spacing in Al—7Si—3Cu Alloy", Association of Metallurgical Engineers of Serbia, MJoM, vol. 15 (2) 2009 p. 105-113.

Popular Science Magazine, "Framework—A New Casting Technique Produces a Stronger, Lighter Motorcycle", Cover, pp. 6 and 19, Jan. 2009.

Prescenzi, Anthony D., "Cast Body Nodes for 2016 Acura NSX", SAE Int. J. Mater. Manf., vol. 8, Issue 3, Jul. 2015, pp. 722-730.

Sutaria et al., Feeding System Design and Evaluation Using Temperature Gradient (Feed Path) Maps, Copyright 2011 American Foundry Society, 9 pages.

Weiss et al., "Ablation of Hybrid Metal Matrix Composites", AFS Proceedings 2011, Paper 11-057, 7 pages.

Weiss, David et al., "Discovering Ablation", Metal Casting Design & Purchasing, Jan./Feb. 2012, pp. 36-39.

International Search Report for PCT/US2017/030173 dated Jul. 28, 2017.

Written Opinion of International Application No. PCT/US2017/030173 dated Nov. 8, 2018, 10 pages.

* cited by examiner

ABLATION CASTING PROCESS

CONVENTIONAL CASTING PROCESS

This application is a continuation application of U.S. patent application Ser. No. 15/581,922 which was filed on Apr. 28, 2017, which matured into U.S. Pat. No. 10,612,114 on Apr. 7, 2020. That application, in turn, claims the benefit of Provisional Application Ser. No. 62/328,849 which was filed on Apr. 28, 2016. The entire contents of those applications are incorporated hereinto by reference.

BACKGROUND OF THE DISCLOSURE

In the traditional casting processes, a molten metal is poured into a mold and solidifies, or freezes, through a loss of heat to the mold. For relatively thermally insulating aggregate molds (such as those made from silica sand) this process is slow, significantly reducing the mechanical properties of the casting. While the rate can be increased by local metallic chill blocks placed in the mold, this is expensive and inconvenient on many molding lines. For this reason, the casting of Aluminum (Al—) and Magnesium (Mg—) based alloys is often carried out in a permanent metal mold, with significant benefits to properties. The direction of freezing is, however, not easily controlled in either aggregate or permanent molds, so that shrinkage porosity remains a common fault for both types of castings, although one type has less porosity than the other.

Furthermore, the rate of heat extraction from all such molds is limited by the presence of the so-called 'air gap'. This is the space that opens up between the cooling and contracting casting and the heating and expanding mold. The rate of transfer of heat from the casting is powerfully limited by this insulating layer of air. Regardless, these conventional casting processes extract or remove heat by way of surface cooling of the component, with the component being solidified either by the mold or by tooling.

When enough heat has been lost from the molten metal so that it has frozen, and cooled sufficiently to gain adequate strength so that it can support its own weight the resulting product, i.e., a casting, can then be removed from the mold. The separation of casting from mold can be somewhat energetic, often involving falling on to grids and/or tumbling for extracting the casting from greensand molds. For chemically bonded hard sands, mold removal usually requires a shake-out on a vibrating grid. Such processes are hot, dusty and noisy, involving the provision of clean and cool air for operators, significant dust extraction systems, and noise containment. For hard and strong castings of iron and steel such separation techniques are usually not damaging to the casting, but Al- and Mg-based alloys are relatively soft and easily damaged by such brutal mechanical techniques. These mechanical techniques can also cause distortion.

Following this initial separation, final cleaning, and possible removal of cores, still requires additional energetic processes such as shot blasting, or even significant energy in the form of heat treatment to burn out core residues.

Recently a novel approach to solve most of the above problems has been developed. It is called the ablation solidification process and is described in U.S. Pat. No. 7,216,691 the disclosure of which is incorporated herein by reference in its entirety.

"Ablation" is the term used in this application to refer to the removal of an aggregate mold by an erosion process in which the application of an ablating medium, such as a fluid causes the aggregate to disintegrate to grain size and the grains to be flushed away in the flow of the fluid. In this way, the surface of the solidifying metal component can be revealed, allowing direct contact between the ablating medium and the metal of the solidifying casting without the formation of any air gap. The direct contact maximizes heat flow from the metal, greatly increasing the rate of solidification and cooling of the metal. The timing of the application of the medium can be prior to complete freezing of the metal in the mold to maximize mechanical properties of the solidified metal, or can be delayed to minimize properties. An important specific example of ablation includes the use of an aggregate mold bonded with a soluble binder and the use of a solute, such as one containing water, as the ablating and cooling medium.

While the ablation process is a significant improvement over the known or conventional casting methods, it would be desirable to enhance the ablation process in order to provide higher productivity for metal products such as forgings, weldments and castings and enhance the properties of such products.

It would be particularly desirable to develop a process which would allow a single, unitary, ablated component or product formed from a molten metal (or perhaps even another type of material such as a plastic) to have different mechanical properties in various portions of the part. A component with one portion of the part having better mechanical properties or metallurgical properties than another portion of the same part has advantages in a variety of fields, including transportation, construction, manufacturing and the like.

BRIEF SUMMARY OF THE DISCLOSURE

According to one embodiment of the present disclosure, a process for the manufacture of metal products comprises the steps of providing a mold, including a first portion comprising an aggregate and a binder delivering a molten metal into the mold and removing the first portion of the mold with a fluid. At least one targeted portion of the molten metal is solidified. Subsequently, a second portion of the mold is removed and a remaining portion of the molten metal is solidified to form the metal product. At least the one targeted portion of the metal product has better mechanical properties, including at least one of a higher yield strength, a higher ultimate tensile strength and an enhanced elongation to failure than are the mechanical properties of a remaining portion of the metal product.

According to another embodiment of the present disclosure, a process for enhancing the mechanical properties of metal product comprises providing a mold, including an aggregate and a binder supplying a molten metal to the mold and decomposing a first portion of the mold with a fluid. A first portion of the molten metal in the mold is cooled and solidified to form a first portion of the metal product. A flow of fluid to a second portion of the mold is stopped for a predetermined period of time. Subsequently, the second portion of the mold is decomposed with the fluid. A second portion of the molten metal is then cooled and solidified to form a second portion of the metal product, wherein the first portion of the metal product has enhanced mechanical properties in relation to the mechanical properties of the second portion of the metal product.

According to a further embodiment of the present disclosure, there is provided a process for controlling the mechanical properties of a metal product. The process comprises providing a mold, supplying a molten metal to the mold, the molten metal when solidified forming the metal product. A selected portion of the mold is removed with a fluid and a first component of the molten metal is cooled and solidified. A solidification of a second component in the molten metal is arrested for a predetermined period of time. Subsequently, solidification of the second component in the molten metal is allowed. A remaining portion of the molten metal is cooled and solidified and a metal product is formed.

According to still another embodiment of the present disclosure, there is provided a unitary, one-piece aluminum alloy component having uniform a-phase values. The component includes a body including a first section having a first set of mechanical properties, a second section having a second set of mechanical properties, wherein the mechanical properties include at least one of offset yield strength, tensile strength and elongation and wherein the first set of mechanical properties is different from the second set of mechanical properties.

According to a yet further embodiment of the present disclosure, a process for the manufacture of metal products comprises the steps of providing a mold including an aggregate and a binder, wherein the mold includes a relatively thin section and a relatively thick section. Molten metal is delivered to the mold. The molten metal is solidified in the relatively thick section of the mold while continuing to deliver molten metal to the relatively thick section of the mold through the relatively thin section of the mold.

BRIEF DESCRIPTION OF THE DRAWINGS

The disclosure may take physical form in certain parts and arrangements of parts or certain process steps, several embodiments of which will be described in detail in this specification and illustrated in the accompanying drawings which form a part hereof and wherein.

THE ABLATION PROCESS

Figure 1:
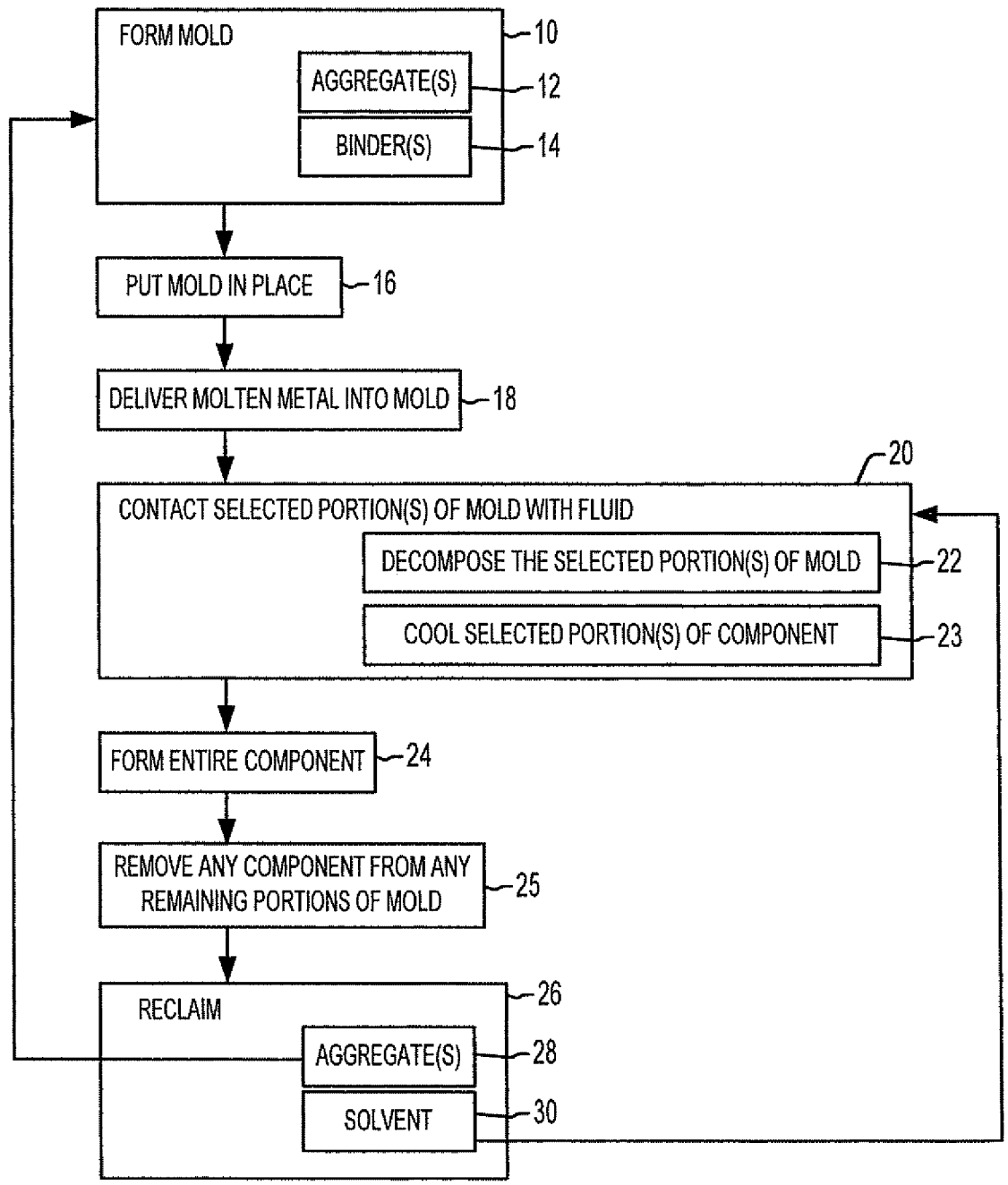
FIG. 1 is a flow chart of the steps associated with one embodiment of the present disclosure.

After or during the filling of a mold that is at least partially made of an aggregate material, the molten metal is subjected to some initial cooling that can be induced by the natural heat extraction from the mold, or may be somewhat enhanced locally by chilling (with metallic chills built into the mold, or mixed with the aggregate such as by the addition of metallic shot particles) or by cooling fins.

Subsequently, this natural rate of heat extraction may be supplemented by the application of ablative cooling, so as to achieve rapid cooling and solidification by either sprays of a coolant/solvent or by immersion into a coolant/solvent.

In ablation solidification, the mold merely defines the shape of the final product but is not intended to act as a major sink for heat. The solidification process no longer relies on the mold for the extraction of heat. The heat extraction and consequent solidification of the component is under separate and independent control.

The dissolution of the binder reduces the aggregate to grain size, facilitating its removal in the flow of a solvent such as water, sweeping away the loosened and separated grains from the metal part or component and transferring them from the ablation station. The mold removal process is gentle, involving no mechanical distortion or impact damage to the metal part, such as a casting. The slurry of aggregate can be subjected to a wet reclamation cycle. The wet processing has the advantage of suppressing all smoke, fume and dust (which are normal major disadvantages of conventional casting process, since expensive large dust and fume extraction systems are usually major features of most foundry installations). After mold removal, metal parts are produced with a bright finish, free from burning stains, clean and washed, and at conveniently cool handlable temperatures.

MOLD AND CORE MANUFACTURE

The mold can be made of a mineral or ceramic aggregate (s) bonded with a binder. More than one kind of aggregate can be employed. Also, more than one kind of binder can be employed. The aggregate and binder is mixed and used to make a mold or fill a core box. Preferably, the mixture is cured in contact with the tooling (the pattern or core box) so that its shape is as accurate as possible. The parts of the mold, together with internal cores if necessary, are then assembled to make a complete mold. This is sometimes known as a precision core process as a result of the accuracy that can be achieved.

An alternative binder curing process can be envisaged in which the mold or core is partially cured in the tooling, gaining sufficient strength to be ejected and handled. It is subsequently fully cured by microwave treatment or by conventional curing methods by converting with a gas and/or gas and thermal treatment purge or combinations thereof. This treatment can also, of course, be carried out in excess of curing requirements to effect complete drying of the aggregate, such as a sand, or even to preheat the sand prior to casting to reduce chilling and improve fluidity for the filling of the mold.

Alternatively, for an investment casting process, the aggregate is bonded with a ceramic or refractory slurry, usually covering a wax pattern. Layers of slurry and aggregate are built up to form a shell of required thickness. The wax is melted out and the shell then fired to achieve sufficient strength and stability for casting.

Once again, the investment mold might be usefully cured, dried and preheated by microwave heating or by curing methods such as by converting with a gas and/or gas and thermal treatment purge or combinations thereof.

THE BINDER

In one embodiment, the binder is an inorganic material that will deliver zero or near-zero hydrogen pick-up to the liquid metal. Thus, the binder can contain little or no water or hydrocarbons. The absence of hydrocarbons will ensure that products of combustion and pyrolysis will not be evolved when subjected to the heat of casting, thus outgassing to produce gas bubbles in the melt will be minimized, and noxious fumes mainly avoided. Any free or bonded water can be reduced or eliminated if necessary by drying at high temperature, well above the boiling point of water, and possibly as high as the casting temperature of the liquid metal. Such a material can also be characterized by low gas evolution on casting that will reduce the need for significant permeability of cores, thus enabling the use of a finer aggregate to maximize surface finish of the castings. The use of a high mold temperature for a part of or the entire mold will further assist the filling of extensive thin-walled products.

Such a binder can be an inorganic binder based on a phosphate glass. One such binder is commercially available from J. B. DeVenne Inc., 1060 West Bagley Road, Berea, Ohio 44017 under Product No. G411-25-25. Other suppliers are also known including HA International LLC, 630 Oakmont Lane, Westmont, Ill. 60559. Such a binder has been developed and introduced only in recent years into the casting industry. The phosphate glass is an amorphous, water soluble material that includes phosphoric oxide, $P_2O_5$, as the principal constituent with other compounds such as alumina and magnesia or sodium oxide and calcium oxide. Other exemplary inorganic binders include silicates, such as sodium silicate, magnesium sulfates and other salts and borates.

Other water-soluble binder systems, again based on sodium silicate, but curable by the action of microwaves or other treatment methods, are attractive candidates for the ablation process. These can develop a green strength within a few seconds to allow the core or mold to be extracted from the core box or pattern. Final curing and drying is carried out in a microwave oven. The high dryness of such cores makes them valuable as internal cores with practically zero outgassing potential, and thus suitable for those situations in which the internal core cannot be vented, thereby posing a threat to the integrity of the casting by creating outgassing bubbles through the melt.

The use of the inorganic binder systems based in sodium silicate have the great benefits of relatively low cost compared to other organic binder systems, and no known toxicity or environmental threat, conferring minimal disposal or recycling problems.

Internal cores are most conveniently bonded with the same or similar water-soluble binder as is used for the molds. Thus, during ablation, parts of the internal core may be removed by the water sprays. However, much of the internal cores material will be expected to remain after ablation is complete and the casting has completely solidified. The cores are then simply washed out at an additional washing station. This is a quick and thorough process (unlike thermal decoring for resin binders in which pockets of core material that have received insufficient oxygen will not have been burned out, and remain to threaten the performance of the casting in service. This is a particular concern with such castings as cylinder heads and blocks, where residual sand can damage pumps, bearings and seals).

The use of cores in the manufacture of components intended for ablation is valuable. The core serves the valuable purpose of ensuring the retention of the accuracy of the component, reducing, but not preventing distortions that can sometimes occur with uneven rates of cooling of different parts of the component.

AGGREGATES

In one embodiment, the aggregate is a mineral such as silica sand. A silica aggregate can be preferentially composed of rounded grains, which impart a good surface finish to the casting and minimize tool and plant wear. The grain size should be fine to confer a good surface finish to the casting. However, particularly for cores, the grain size may have to be increased if the core is required to be permeable to vent gases during a filling of the mold and solidification. Silica sand possesses many desirable characteristics as an aggregate, including good availability, low cost and good thermal properties up to its alpha/beta quartz transition temperature. Its significant disadvantage of the danger of its respirable dust, normally a significant problem in most foundries, is practically eliminated by the wet processing involved in the ablation process.

Other minerals such as olivine, chromite or zircon are also widely used, particularly for their chilling properties, and may be used for ablated components, but the rapid cooling causes the fluidity of molten alloys to be poor in such molds, and ablation is more difficult to apply prior to some freezing of the component. The limitation to fluidity in particular limits the filling geometry to smaller, chunky parts.

Alternatively, the aggregate might beneficially have low thermal diffusivity, extracting little heat from the molten metal, therefore permitting long flow distances before the molten metal is arrested by freezing, or allowing plenty of time for the application of ablation cooling so that the process described herein can operate with maximum effect. Thus large, 'rangy' components are possible with such mold materials. A product of flue gases from fuel-fired power stations is particularly useful. It takes the form of minute hollow ceramic spheres that have low density, low heat capacity, low thermal conductivity and low heat diffusivity. Such aggregates have a number of trade names such as 'CENOSPHERES'. Similar 'adiabatic' materials of low thermal diffusivity include 'perlite', which is a variety of exfoliated (expanded) clay. A more complete description of such 'adiabatic' materials is found in U.S. Pat. No. 7,165,600 dated Jan. 23, 2007 which is incorporated hereinto by reference in its entirety.

A potentially attractive molding material of intermediate chilling power is marketed under the name of 'GREEN DIAMOND'. This by-product of chromium production is a green-colored fine aggregate of rounded grains including a mix of mechanically hard stable oxides such as chromia, etc. It contains no free silica and so is free from health hazards.

It has a melting point above 1200 C. Other artificial aggregates are potentially attractive, including a number of agglomerated aggregates based on alumina or aluminosilicates of various types. These consist of hard, spherical grains that flow and mold well, forming attractively hard, evenly packed molds with high permeability which aids the productivity of mold production.

Molds can of course be filled and ablated singly, but it is easily seen that multiple molds and/or molds with multiple impressions can be ablated simultaneously to enhance production rates. Also, molds can be filled and ablated sequentially, as for example, on a horizontal conveyor. The automation of such production lines by robot or other means is well known.

Quite a different kind of aggregate mold is presented by the investment casting (lost wax) process, in which a ceramic aggregate is bonded with a ceramic slurry and fired to high temperature. The mold is not particularly soluble in water so that the use of ablation sprays is not especially effective in removing the invested shell mold. Despite this, because the mold can be made to have a degree of permeability, the ablating fluid or solvent can penetrate the shell and so can effectively cool and solidify the liquid metal component, allowing a usefully high degree of control over the freezing of the part.

Recently, there have been developments in water-degradable investment shells for Mg- and Al-alloys, that might even be appropriate for higher melting point alloys such as copper (Cu—) based alloys and cast irons. These water-degradable shells are especially attractive, combining the benefits of investment casting (normally characterized by indifferent or mediocre properties as a result of the slow cooling in the relatively insulating shells) with enhanced properties because of enhanced rates of solidification, plus enhance soundness as a result of progressive freezing towards the feeder under the action of high temperature gradients that the ablation process can provide.

FIG. 1 illustrates the steps of a process according to one embodiment of the present disclosure. The first step in the process is to form a mold as shown in block 10. The mold comprises an aggregate 12 and a binder 14. Once the mold is formed, it is put in place so that it may be filled with a molten metal at step 16. The molten metal is then delivered into the mold at step 18. The mold may be designed to allow the molten metal to be delivered according to any of the methods described below. The mold is then subjected to the action of or contacted by a fluid solvent, such as at 20. Subsequently, at least selected portions of the mold are decomposed as at 22 and selected portions of the component are cooled as at 23. Of course, the entire mold can be decomposed at once, if so desired, making it a component formed by the known ablation process as taught in U.S. Pat. No. 7,216,691 which is incorporated hereinto by reference, in its entirety.

However, it is desirable according to one embodiment of the present disclosure that only a selected portion, or several spaced selected portions, of the mold are initially contacted with a fluid or solvent to decompose such selected portions of the mold. The purpose for doing so is to enhance the mechanical properties of that portion of the unitary component or metal part which is being formed within the mold in comparison to other portions of the component. A single unitary metal part or component having different mechanical properties for different portions of the metal part formed may be particularly advantageous in a number of different environments. For example, such a metal part may be beneficial for use for structural components of buildings or bridges or various structural components for machinery. In one particular example, a metal component having differing mechanical properties may be useful in vehicles so that a desired section of the component will deform more quickly than other sections of the component. This may be particularly useful for crush zones of vehicles, such as motorcycles, airplanes, trucks, boats or automobiles.

While one portion of the mold is being decomposed so that a fluid or solvent contacts the underlying molten metal to cool same and give it differing mechanical or metallurgical properties from the remainder of the component which is to be formed in the mold, the other portions of the molten metal contained in the mold may be cooled at one or more different rates thereby giving different properties to the remaining portions of the component which is eventually formed in the mold.

It should also be appreciated that not the entirety of the mold needs to be made from an aggregate and binder. In other words, some portions of the mold could be made of metal or another permanent substance so that the molten metal contacting those portions of the mold may cool at a different rate than the molten metal which is located adjacent the aggregate portion of the mold.

Subsequently, the entire component is formed as at 24. Any remaining portions of the mold are then removed as at 25. As mentioned, the remaining portions of the mold may not all be made of the same aggregate and binder combination as the mold section which is contacted with a fluid or solvent. A reclamation step 26 can then be accomplished such that at least one of an aggregate 28 (which can be at least a portion of the aggregate 12) of the mold and, if the fluid contains a solvent 30, and the solvent is reclaimed.

Figure 2:
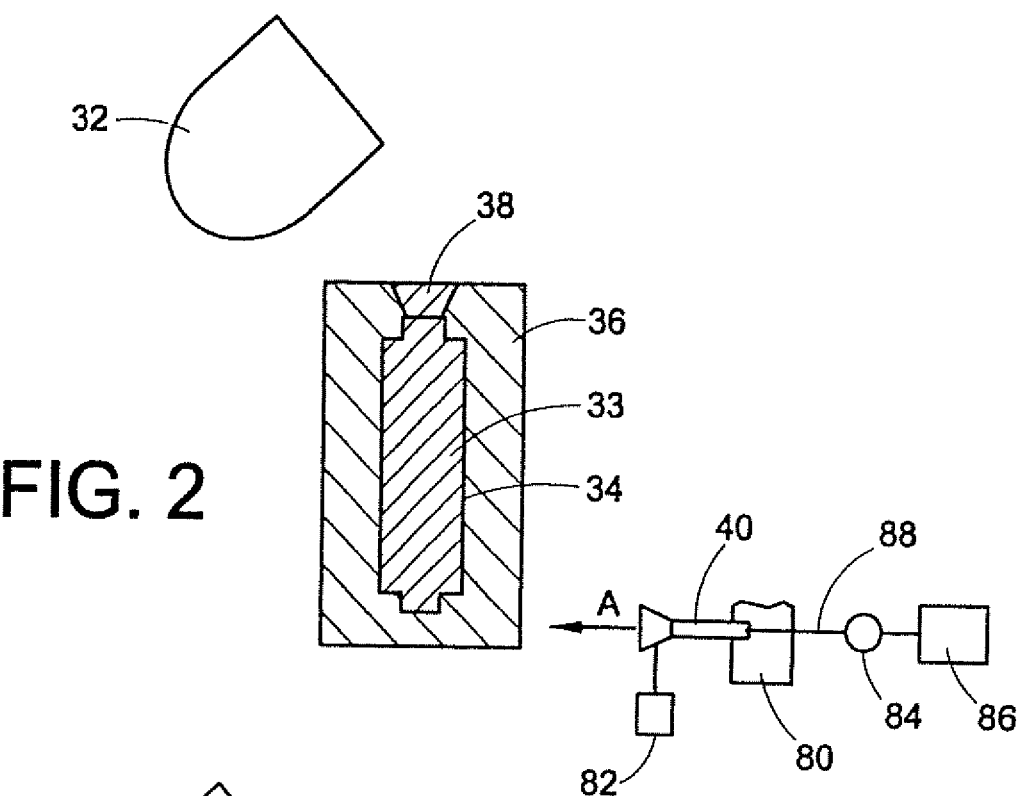
FIG. 2 is a schematic side view of a layout of an apparatus for one embodiment of the present disclosure.

Turning now to FIG. 2, in this embodiment, a crucible or ladle 32 has been used to pour molten metal 33 into a mold cavity 34 that is defined by a mold 36 of the above-described aggregate and binder composition. A riser 38 is designed to be sufficiently large to ensure it is the last portion to freeze. A spray nozzle 40 mounted to a housing 80 directs a jet of solvent A, which can be a fluid or solute such as water, at the mold 36. A control 82 can regulate the flow of solvent fed via a pump 84 fluidly connected to a reservoir 86 via a conduit 88. The jet A may be delivered in any suitable configuration from narrow stream to wide fan and may be a steady stream or pulsating stream as directed by the particular application.

Figure 3:
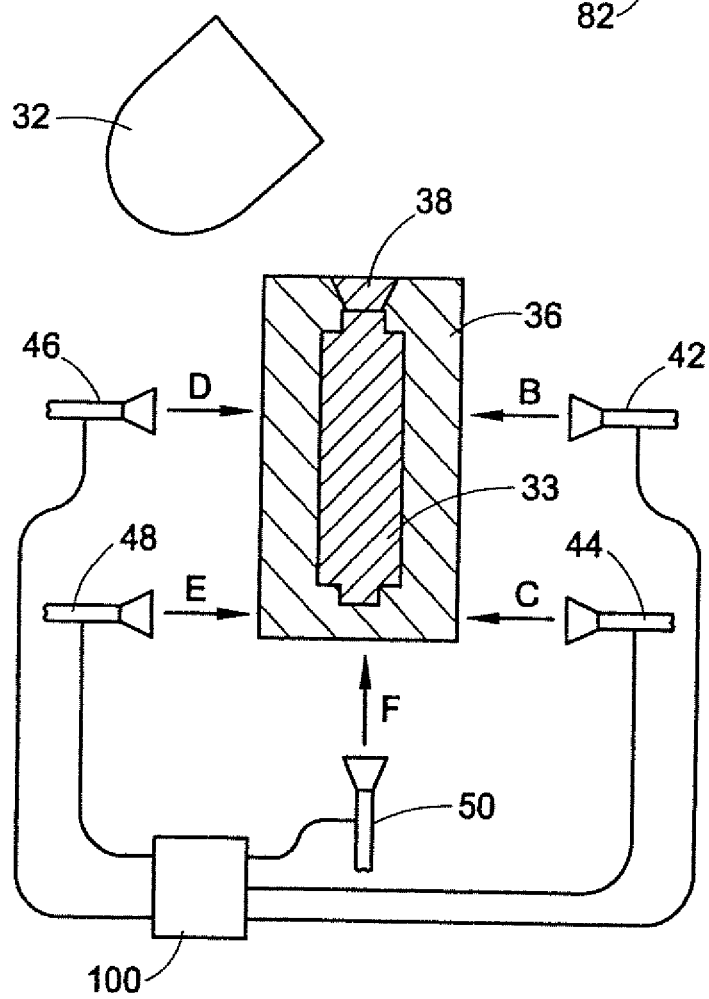
FIG. 3 is a schematic side view of a layout of an apparatus for another embodiment of the present disclosure.

With reference now to FIG. 3, the application of solvent is not limited to a single direction or from a single nozzle. For example, two or more nozzles 42, 44, 46, 48 and 50 may be present, removing the mold 36 from multiple directions. Each nozzle can spray a respective jet of fluid B, C, D, E and F at the mold 36 as controlled by a regulator 100. In this manner, the mold 36 may be decomposed as desired, for example, in a rapid and uniform manner or in staged sections at intervals as may be desired for a particular component to be formed. For example, the delivery of the solvent may be via one or more of the jets C, E and F at the base of the mold. Alternatively, the delivery of the solvent may begin in the middle of the mold by one or more jets B and D. Any other alternative can also be employed.

MOLD FILLING (CASTING)

Once the mold is formed it may be temporarily stored, or immediately filled with a molten metal. The filling of the mold can be accomplished in a number of ways:
1. The molten metal can be poured into the mold; a common technique known as 'gravity pouring'.

2. The mold may be filled more gently by gradually changing the angle of slope of the mold, known widely as 'tilt casting'.
3. The molten metal can be transferred into the mold through a 'counter gravity' delivery system such is disclosed in U.S. Pat. Nos. 6,103,182 and 6,841,120 which are incorporated herein by reference in their entireties.

After delivering the molten metal, or melt, into the mold, the mold is subjected to the action of or contacted by a fluid, as described below.

THE ABLATING FLUID

The eroding or decomposing medium or solvent can be water if the aggregate binder is water-soluble. This is perhaps the most attractive ablation medium. Its environmentally benign properties, low cost, availability and effectiveness as a cooling medium are powerful assets.

Water is especially appropriate since it acts as both the binder solvent and as the cooling medium. Water has high heat capacity and latent heat of evaporation, hence solidifying and cooling the component to maximum effect.

Other eroding media can be envisioned. For instance, the water might be more conveniently somewhat acidic or alkaline, or some other aqueous chemical composition depending on the dissolution mechanism for the binder. Alternatively, some binders, particularly those based on resins, might require an organic solvent. Alternatively still, other fluids and mixtures can be envisioned: liquid nitrogen, or cooled gaseous nitrogen evolved from liquid nitrogen, could be valuable to freeze and embrittle a binder, dislodging and carrying away grains of aggregate whilst providing the desirable cooling to the component after the ablation or other removal of the mold. Similarly, particles of dry ice, solid carbon dioxide, can be jetted onto the mold to effect the mold removal by mechanical impingement and the minute explosive detonations of the particles as they revert to gas. This medium would also be advantageous to provide excellent direct cooling after mold removal. Other mixtures of fluids containing entrained solid particles jetted on to the mold may be useful; the solid particles entrained in the fluid could in principle be any kind of particulate solid such as plastic or glass beads, alumina grit or walnut shells etc. Most conveniently however, the entrained particles could be of the same material as the aggregate of the mold so as to avoid any subsequent separation process or problem of contamination of recycled mold material.

The ablating and cooling fluid can be delivered by spray nozzles. Alternate delivery mechanisms for the binder solvent and cooling medium are also contemplated, such as via an impeller, over a waterfall or the like. For some geometries and sizes of component, simply lowering the mold progressively into a pool of water (with internal spray jets, for example) or another ablating fluid may be adequate or desirable. But, such alternate delivery mechanisms can be explosive as well making the systems based on spraying the solvent better suited for the ablation process.

For those delivery systems based on jets of water issuing from nozzles, the rate of delivery of water is adjusted to ensure that the water arrives at the casting surface first by percolation through the mold, arriving at the casting ahead of the arrival of the main jets. In this way the molten metal is enabled to develop a sufficiently solid skin prior to the arrival of the main force of the jets. Alternatively, by judicious programming of the timing and rate of delivery of solvent/coolant, the surface of the component can avoid damage by its temperature being reduced to gain sufficient strength prior to the application of the full force of the applied coolant. Thus, the timing and the force of the solvent delivered by the jets needs to be controlled so that no damage is done to the component, but simultaneously will deliver at the correct time sufficient pressure to overcome the formation of a vapour blanket that would reduce the rate of transfer of heat.

The delivery of solvent, for instance by spray nozzle, may begin at the base of the mold. The mold can be lowered to allow the nozzle to deliver the solvent in a progressive manner to intact portions of the mold so that the mold entirely decomposes. In the alternative, the mold may remain stationary and the nozzle may be caused to move in order to progressively deliver a jet of solvent to decompose at least part of the mold. In the case of rotationally symmetrical molds the entire circumference of the mold is required to be contacted by the jet for rapid decomposition. The mold may be rotated or the spray nozzle may be moved in an approximately circular orbit about the mold. Alternatively, for certain components, the spray may begin in the middle of the mold, or at some other desired location.

The rate and pressure of delivery of the jet are of a setting that is high enough to decompose the mold, yet low enough to allow the solvent to percolate through the mold so that percolated solvent arrives at the molten metal ahead of the full force of the jet. For example, for an Al alloy casting in the weight range of 1 to 50 kg, high volume, low pressure delivery in a range of about 0.5 to 50 liters per second, lps (10 to 100 gallons per minute, gpm) at a pressure ranging from 0.03 to 70 bar (0.5 to about 1,000 pounds per square inch, psi) may be advantageous. In this manner, the percolated solvent causes the formation of a relatively solid skin on the component before the molten metal is contacted by the force of the jet, thereby preventing distortion of the component or explosion from excessive direct contact of the solvent with the molten metal.

The addition of a surfactant, as known in the art, to the ablating fluid or to the binder formulation may enhance percolation of the solvent through the mold. In addition, at least some of the heat that is absorbed from the molten metal by the mold may stabilize the mold for controlled mold removal. As mentioned, a phase change of the solvent or cooling fluid, for instance to vapor, enables the rapid removal of heat from the component and its sections.

An additional consideration for the rate and pressure of the delivery of the fluid is the contact with the filled metal component once the mold has decomposed. The rate and pressure of the fluid must be low enough to prevent damage to the metal component, but must be high enough to overcome the formation of a vapor blanket. A vapor blanket is formed by the evaporation of the solvent that has percolated through the mold to contact the semi-liquid or liquid metal in forming the solidified skin on the component. The vapor blanket reduces the transfer of heat away from the metal component and is detrimental to the rapid cooling that is necessary to obtain the desirable properties and effects that are described above. Thus, it is advantageous to adjust the conditions of delivery to overcome the vapor blanket.

Control of the ablation fluid may be exercised in at least two ways. The rate and pressure of delivery may be set to achieve all of the above parameters, or two separate settings may be used. If two separate settings are used, one setting may be established for decomposition of the mold and a separate setting may be timed to replace the decomposition setting when the fluid jet is about to contact the metal component. Of course, the manner in which the flow is delivered, i.e., narrow stream, wide fan, steady flow, intermittent pulse, etc., will likely affect the rate and pressure settings accordingly.

It is important to note that the application of ablative fluid is not limited to a base-to-top direction of spray. Depending on the application, it may be desirable to spray from the top of the mold to the bottom, from a midpoint to one end, or in some other pattern.

The application of solvent is not limited to a single direction or nozzle. For example, two or more nozzles may be present, ablating the mold and the component from multiple directions. In this manner, the mold may be decomposed more rapidly and uniformly, if desired in a particular application. For example, the delivery of the solvent may be via one or more of jets at the base of the mold and the component. Alternatively, the delivery of the solvent may begin in the middle of the mold by one or more of jets. Alternative configurations could include use of jets in any other desired combination. Any number of nozzles may be present, as a great number of nozzles may be advantageous for large or complex molds or a few nozzles may provide optimum coverage for other molds. The mold may be rotated and/or moved vertically to allow complete coverage of the mold, or the nozzles may be moved while the mold and casting remain stationary. A robot can be programmed to direct an array of spray nozzles or move the mold and component in a controlled manner through an array of spray nozzles.

In addition, when multiple nozzles are used, it may be advantageous to time the function of the nozzles to complement one another. For example, a fixed array of nozzles surrounding the mold may be coordinated, timed to switch on and off to cause a spray to move across the surface of the mold to create progressive ablation of the mold and the component and to provide the desired characteristics of the solidified component. Ablating fluid supplied at pressure by a pump can be controlled via a regulator which in turn can be programmed to activate nozzles in the desired sequence and for the desired time.

Naturally, the rate of solvent delivery can either be constant or it can be varying, as desired. For example, for certain metals and certain molds, it may be advantageous to vary the rate of solvent delivery, whereas for other types of metals or molds, a constant rate of delivery would be beneficial. Similarly, the pressure of solvent delivery can be varied or can remain constant. Conventional pumps can be employed which can be suitably regulated to achieve the desired fluid delivery rates and pressures, whether they be varying or constant.

Heat can of course be extracted by a cooling fluid that can in another embodiment be liquid nitrogen, dry ice particles in an air stream, etc. In other words, two different kinds of fluids can be used in the ablation process such that a first fluid, such as water, is used initially, and then a different fluid is used thereafter in order to further cool the solidifying metal part.

While one means of applying the solvent is via a pressurized jet or spray from a nozzle, other means are also conceivable.

SOLIDIFICATION CONTROL

For some components and some alloys, often depending on the section thickness of the metal part and the nature of the freezing front developed by the alloy, it may be desirable to allow the component to solidify a little, prior to the application of ablation. For other metal parts, particularly thin wall parts, it is more usual to seek to apply ablation as rapidly as possible, since natural cooling in the mold is taking place rapidly. Of course, if the component has frozen prior to the application of ablation the benefits to the properties of the component will have been lost, creating a conventional casting. Even so, other important processing benefits remain, such as the gentle and complete de-molding, and absence of fume and dust etc.

Moreover, the delivery of a fluid, such as a solvent, in a manner such as spraying may have a strong zonal cooling effect on the molten metal, encouraging the desired portion or portions of a component to solidify, while the remainder of the component being formed can retain at least some liquid metal. The jet may be delivered in any suitable configuration from a narrow stream to a wide fan and may be a steady stream or a pulsating stream, as dictated by the particular application. The presence of the reservoir of liquid alloy metal, while adjacent portions of the component were solidifying, facilitates the feeding of the molten metal into the solidifying metal, securing the soundness of the component.

Assuming that ablation is applied to the mold prior to complete solidification of the casting, there are a number of different processing strategies.

The unidirectional solidification aspect disclosed in U.S. Pat. No. 7,216,691 was influenced by a number of factors that were in the common thinking of that time. For instance, the process is similar to other progressive solidification techniques such as the growth of single crystals by Bridgman type processes which adopt unidirectionality for the progress of solidification and cooling. Thus, unidirectionality was the norm, and was basic to the thinking of metallurgists and process engineers at that time. In conventional castings, all reactions for the liquid alloy going to solid have the latent heat being removed from the surface of the casting. One aspect of the present disclosure, on the other hand is that the latent heat for at least one of the solidification reactions occurs by removal of the latent heat by the cross section of the component being manufactured.

There are some components for which the unidirectional ablation process may not be suitable. These include components with isolated heavy sections that are not easily fed. In addition, it may be necessary for certain components to enhance the freezing process locally to obtain better mechanical properties for a highly stressed portion of the casting. Furthermore, for castings designed to fail at a certain location it may be necessary to reduce or avoid ablation to reduce properties in this locality.

The rate of freezing that can be achieved by ablation exceeds the rate achievable by all other aggregate molding processes, and can exceed the rate of cooling achieved in permanent molded castings, and even squeeze castings. This superior rate is the natural consequence of the elimination of the air gap which constitutes a main limitation to heat flow and which affects all other shaped casting processes (including many parts of a squeeze casting, since not all parts of the casting touch the die even during the application of maximum pressure). Thus, for an aggregate molded casting the structures developed in the solidifying alloy can be uniquely fine, conferring uniquely attractive properties of high strength accompanied by high ductility.

The water jets are arranged to be directed at the mold, delivering water at a pressure sufficient to dissolve the binder and decompose the mold. U.S. Pat. No. 7,216,691 described the progressive unidirectional relative motion of the mold and the water jets, causing the freezing front in the casting to progress steadily, in a unidirectional manner, eventually completing the freezing of the casting.

The action of the coolant, and the progress of the coolant, caused to advance over the surface of the component, is to generate a steep temperature gradient in the component along its cross section. In this way the depth of the pasty zone (the region between the liquidus and solidus temperatures of the alloy) is reduced, aiding the flow of interdendritic feeding liquid, so that the component achieves maximum eutectic flow.

It has now been found that an extension of this approach is needed. In certain circumstances, it is beneficial to drive solidification from multiple directions towards a single feeder, or in multiple directions towards multiple feeders. Such feeders can even be located on the bottom of the mold with the molten metal being pushed up against gravity. This technique has been termed targeted ablation.

Targeted ablation is particularly useful and powerful to address the problems of isolated heavy sections that are not easily fed. By targeting these regions, ensuring their rapid solidification prior to the solidification of the remainder of the component, the freezing front can subsequently be progressed to other less-problematic regions (which may be less thick). Thus, heavy bosses can usually be frozen soundly without the expense and inconvenience of additional feeders or chills, since the relatively thick bosses can be fed through the relatively thin sections of the component. Alternatively, the freezing of sections of any thickness can be enhanced, raising the mechanical or other material properties locally. Alternatively again, if the component is designed to fail at some particular location, ablation can be reduced or avoided at this location to alter the cooling rate of the various alloy reaction steps and reduce properties locally. There are a number of metal components which are designed to fail in defined locations for safety reasons, particularly in motor vehicles, for example. Targeted ablation allows for the production of metal parts which have defined failure zones.

Targeted ablation also provides the possibility of greatly enhanced rates of production. The freezing time of a component that was ablated unidirectionally from one end to a feeder at its far end can, of course, be halved by ablating simultaneously from the two ends and finishing at a central feeder. Clearly, more complex castings which are ablated simultaneously from multiple locations in multiple directions towards multiple feeders can be achieved with great rapidity.

The targeted ablation approach has the important advantage that the natural amount of solidification occurring in the mold (as a result of natural heat extraction by the mold) prior to the arrival of the ablation cooling is reduced, resulting in improved rates of cooling. Also, of course, larger castings can be tackled without incurring the penalty of loss of the advantages of ablation as a result of prior cooling by the mold. In another embodiment, the entire mold or a portion of the mold can be made from an aggregate comprising a refractory particulate material and a soluble binder so as to provide a mold with minimal heat transfer between the mold and the molten metal. This reduces the chilling effect of the mold, thereby lessening the cooling of the melt held in the mold and also for very thin sections that would normally freeze quickly. Such mold materials are discussed in U.S. Pat. No. 7,165,600, the subject matter of which is incorporated hereinto by reference in its entirety.

At percentages below about 13 percent, whatever silicon is added to the aluminum dissolves into the solution. When the alloy contains silicon at a percentage which is less than the saturation percentage, it is called hypoeutectic, i.e., a hypoeutectic alloy. Most aluminum alloy compositions are hypoeutectic. At about 13 percent or so, the aluminum alloy becomes saturated with silicon. An aluminum alloy that is saturated with silicon is known as eutectic. Once past that saturation point, any silicon added after the saturation point will not dissolve into the final aluminum alloy. Such alloys are known as hypereutectic alloys.

In relation to Al alloys, the process applies to Al casting alloys such as Al-7Si-0.4 Mg (A356) alloy, and various hypoeutectic alloys. The process can also apply to high silicon alloys containing up to 17 or more wt % Si (hypereutectic aluminum alloys). The process can also apply to high strength Al-4.5Cu based alloys such as A206 and A201 alloy.

The process for enhancing material mechanical properties of a targeted portion of a metal component, such as an aluminum alloy component, is beneficial in that there is provided localized cooling without an air gap between the mold and the molten metal which is cooling (and, hence, shrinking somewhat away from the mold). Such an air gap is deleterious in that it reduces the rate of cooling because air serves as an insulator. Having localized cooling without an air gap greatly expedites the cooling process. Thus, a uniform microstructure can be achieved in both the relatively thick and the relatively thin sections of a single component by targeted ablation, whereas a casting has difficulties in achieving such a uniform microstructure. In one embodiment, such a microstructure can have a secondary DAS of about 40 to 50 micrometers or a cell size of 10 to 110 μm.

Targeted ablation is therefore a novel process retaining the advantages of ablation, but with (i) ability to tackle larger or more complex castings; (ii) enhanced rates of production; and (iii) reduction of solidification by heat extraction from the mold, and either replacing this with the preferred heat extraction by ablative cooling resulting in quality benefits to the alloy structure of the component, and/or tackling more extensive components that cannot be made by conventional casting processes or by forging methods.

METALS AND ALLOYS

The ablation process has so far been demonstrated to be appropriate for the conversion of liquid melts of Mg- and Al-based alloys, but is expected to be suitable for the same conversion of liquid melts to solids of any metal or metal alloy, including non-ferrous alloys based on copper, as well as ferrous alloys and high temperature alloys such as nickel-based and similar alloys.

In addition, whereas the wrought alloys such as the 6000 and 7000 series are generally thought to be impossible to pour successfully as shaped castings because of their excessively short and long freezing range that creates problems of feeding, leading to shrinkage porosity and hot tearing, ablation casting has been shown to achieve sound products.

METALLURGICAL FEATURES

After complete solidification of the casting, the casting may be subjected to conventional heat treatments including such treatments as (i) aging only to strengthen those portions of the casting that had received the benefit of a solution treatment at high temperature, while additionally giving some strengthening to other parts of the casting that would not have received the benefit of the solution treatment, but would have retained a little solute in solution; and (ii) solution treatment, quench and age, in which case those portions of the casting that had already received a solution treatment would benefit additionally from an additional treatment, and those portions that had not received the prior solution treatment would benefit conventionally from a conventional full heat treatment of solution, quench and age.

Naturally, any quenching treatment that would be applied to the relatively stress-free casting produced by the interrupted cooling and solidification would benefit from a quench that did not re-introduce significant stress such as an air quench or polymer quench rather than a water quench.

By extremely rapid extraction of heat the mechanical properties of the casting are maximized. The heat treatment response of the alloy will be enhanced because of the finer spacing of the microstructure, conferring more rapid homogenization because of the significantly shortened diffusion distances involved.

In some circumstances, properties are enhanced sufficiently that heat treatment can be simplified, so that a long and expensive high temperature solution treatment, quench and low temperature age can simply be replaced by a low temperature ageing treatment. The avoidance of the solution treatment and water quench is particularly advantageous: not only are time, energy and costs greatly reduced, but the water quench introduces the danger of stressed and/or distorted castings. It is a major advantage to avoid a water quench so as to avoid residual internal stress and retain the accuracy of the casting, particularly so that a separate straightening operation can be avoided and machining operations can be reduced or eliminated.

Furthermore, in some favorable cases, even ageing may not be necessary.

As mentioned, the enhanced mechanical properties which can be created in the component due to targeted ablation result from the removal of the mold from a predetermined area so that the portion of the component underlying the removed area of the mold can be contacted by the fluid in order to solidify that portion of the molten metal which is forming the component. Such enhanced mechanical properties can include greater ultimate strength, higher yield strength together with improved elongation. The enhanced mechanical properties can also be that the first portion of the component comprises dendrites having a dendrite arm spacing (DAS) that is less than the dendrite arm spacing of the remainder of the component. The dendrite arm spacing can be secondary dendrite arm spacing. The secondary dendrite arm spacing is a direct measure of the freezing rate of a metal alloy component, and is generally recommended and used for this purpose. Although the use of primary DAS might be open to some criticism, on the ground that this is not the best measure of solidification rate, a practical measure that avoids the choice between primary and secondary DAS is the use of cell spacing, in which any dendritic fragment, whether primary or secondary arm or grain counts as a 'cell'. In view of the difficulties of distinguishing between primary and secondary dendrite arms in some Al alloys, in which dendritic growth adopts rather irregular shapes, the measurement of cell spacing is practical and valuable and has been demonstrated to be a good measure of the first reaction freezing rate in aluminum hypoeutectic alloys. The enhanced mechanical properties are the result of the accelerated freezing time, i.e., the solidification time of the molten metal. As the solidification time is reduced, a finer dendrite arm spacing (or secondary dendrite arm spacing) is generated. The refinement of the structure is caused by the greatly increased cooling rate. As mentioned, the yield strength is or can be higher in the first portion of the component, the ultimate tensile strength is or can be higher in the first portion of the component and the elongation is or can be higher in the first portion of the component.

Although the mechanical and material property benefits of ablation are commonly attributed to the reduction in DAS or cell size, it occurs that the DAS or cell size upon freezing by the action of the mold and the application of ablation perhaps is the result of the freezing-in of oxide bifilms (which resemble cracks) in their compact, convoluted state. The loss of properties suffered by slower conventional cooling in competitive processes arises as a result of the unfurling of the bifilms, unfolding to become more serious engineering cracks of 10 times or more increased in size compared to the compact bifilm form. All those mechanical properties that benefit from reduced sizes of initiating defects therefore benefit from faster freezing. These properties include ductility and ultimate tensile strength (UTS). It is worth noting that the simultaneous improvement in strength and ductility (elongation and toughness) is an especially welcome benefit, since efforts to raise strength normally result in a simultaneous reduction in ductility. This double benefit from fast freezing can be fully accounted for by the bifilm theory. In contrast, the reduction in DAS (or cell spacing) can normally only contribute a small benefit to strength, but can contribute nothing to ductility, in line with prediction of the Hall Petch Equation.

Although ablation is most usually applied to raise the properties of the complete component, there are instances in which targeted regions of the casting require to exhibit reduced properties. This can be achieved during ablation by ensuring that the corresponding portion of the mold is not removed because it is not contacted by the solvent fluid. As to that portion of the mold, it will have reduced mechanical properties, i.e., a lower yield strength, a lower ultimate tensile strength and a lesser percentage of elongation. It is this remaining portion of the component which will have reduced mechanical properties. The selected area of the component having reduced mechanical properties can be designed to be the first portion of the component to fail.

It is becoming common in the automotive field to ensure that components fail at specific locations and in specific geometric modes to reduce decelerations during wreck impacts, absorbing energy, and maintaining the safety of car occupants (for instance ensuring the collapse of the suspension and steering components to ensure that the steering wheel does not impact the driver). It should be apparent that any number of other reasons can be contemplated for providing either reduced mechanical properties or enhanced mechanical properties for a particular portion of a unitary one-piece metal product, member or component. Thus, either reduced mechanical properties or enhanced mechanical properties can be provided for one or more portions of a component according to the present disclosure.

INTEGRATED ABLATION AND SOLUTION HEAT TREATMENT

The process of rapid cooling and solidification may be interrupted for a dwell period, allowing those solidified portions of the component to reheat, gaining heat from those regions of the component that remain liquid, so as to provide a high temperature solution treatment to those portions of the component that were solidified, and the accompanying loss of heat from those portions of the component that remained liquid are thereby caused to further solidify, but the whole component concomitantly receiving the benefit of cooling more slowly, and more evenly, so as to greatly reduce internal stress and distortion in the solidified component.

The cooling process can be reapplied after a suitable dwell period. The cooling rate can now preferably be sufficiently high to retain a useful proportion of solutes in solution in the alloy whilst sufficiently slow to avoid the generation of high residual stress in the component.

MICROSTRUCTURE

The microstructures of products from aggregate molds solidified by an ablation process are unique.

The Al—Si alloys as conventionally cast generally exhibit a mixed microstructure of primary Al dendrites and the Al—Si eutectic phase. In ablated components it is typical for some primary dendrites to form by heat extraction from the mold in the first few seconds or minutes after pouring. These have a secondary dendrite arm spacing (DAS) that is typical of conventionally solidified products since this phase of solidification is controlled by the modest rate of heat extraction by the mold. After the application of ablation, resulting in some mold removal and direct impingement of coolant on the surface of the component, the rate of heat extraction increases by a factor between 100 and 1000 times. Because of the approximately one third power relation between DAS and cooling rate, the DAS correspondingly reduces by a factor of up to 10 times approximately. If any dendrites are still growing, their DAS is now suddenly reduced by this large factor. This is usually clearly seen. The other feature of the ablated microstructure is the extreme fineness of the eutectic phase, which is typically of the order of 1 micrometer spacing, and so hardly resolvable at 1000× magnification in the optical microscope, the phase appearing to be a uniform grey color rather than the usual unmodified coarse and spiky form of silicon particles. Thus, the structure is now essentially modified, although no additional chemical modifying elements were necessary to achieve this transformation, but small amounts of Sr or Na to 20 PPM can be helpful.

A further feature of the microstructure of ablated castings is the relative coarseness of the structure adjacent to the component surface, but a fine structure in the center. This characteristic structure is the opposite of that expected in conventional Al alloy castings, which exhibit the fastest cooling near the mold surface, and in which cooling slows progressively towards the center of the casting since conventional casting processes all extract latent heat of solidification from the surface of the casting.

If ablation has been applied rather late, a normal coarse structure may have had time to develop throughout the casting section, so that ablation will now act only on those remaining pockets of liquid, resulting in a dual structure, generally coarse but with pockets of extremely fine structure. This once again is unique to ablation in Al- and Mg-based alloys.

RECYCLING AND RECLAMATION

The aggregate can be recovered and recycled. In addition, the water also can be recirculated. The build-up of binder in solution in the water can be continuously reduced by a binder removal and/or reclamation system.

EXAMPLE I

Figure 4:
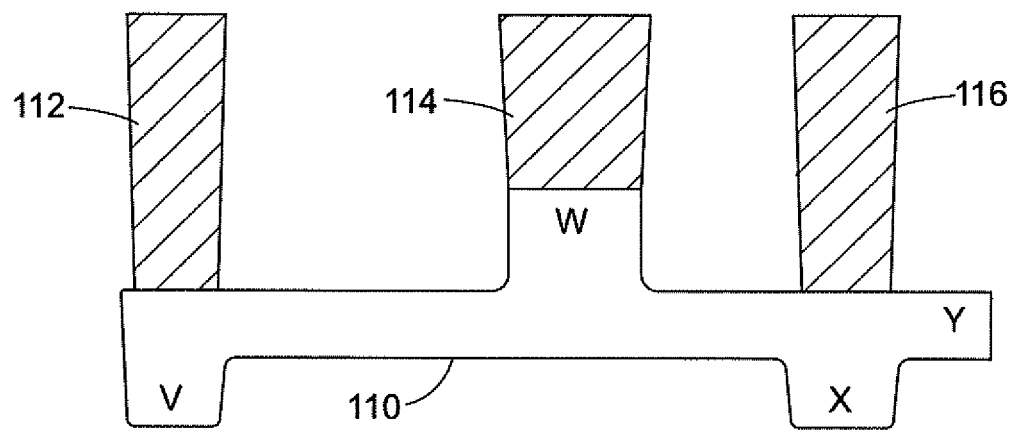
FIG. 4 is a schematic side view of a metal part treated in accordance with a method of the prior art.

FIG. 4 illustrates a conventional casting technique of the prior art, in which the three heavy bosses V, W and X, disposed on a thinner plate 110, all require separate feeders (risers) 112, 114 and 116 respectively to ensure their soundness. Unfortunately, the addition of the feeders slows even further the rate of freezing of these heavy sections, with the result that the properties of the bosses are relatively poor.

Figure 5:
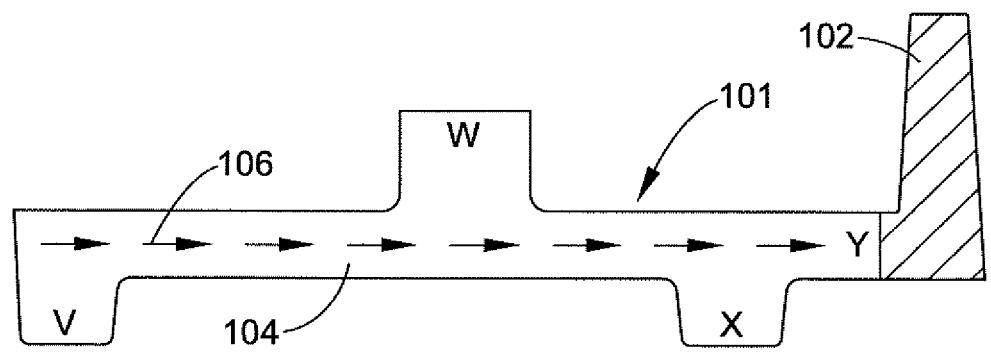
FIG. 5 is a side view of a metal part treated in accordance with the method disclosed in U.S. Pat. No. 7,216,691.

FIG. 5 discloses a casting or plate 101 designed to be solidified by conventional unidirectional ablation cooling according to the prior art. Ablative cooling by water sprays starts at boss V, taking time to solidify boss V before proceeding to cause the sprays to move along a body 104 of the plate in the direction of arrows 106. On reaching the central boss W the rate of progress of ablation is once again slowed while heat is extracted from W to ensure its complete solidification prior to once again progressing along the plate in the direction of the arrows 106. Progress will again be slowed at X. The remaining casting plate at Y will finally be solidified while all the time receiving feed metal from the feeder (riser) 102, which is, of course, the last portion of the casting/feeder assembly to freeze. The time taken to progress along the complete length of the casting plate plus the additional time required to freeze the heavy bosses sometimes creates problems because natural loss of heat to the mold during this extended period causes items distant from the start, such as X and Y and the feeder, all to freeze at least partly without the benefits of ablation cooling. In some cases, complete premature freezing of the feeder will prevent the attainment of a sound casting.

Figure 6:
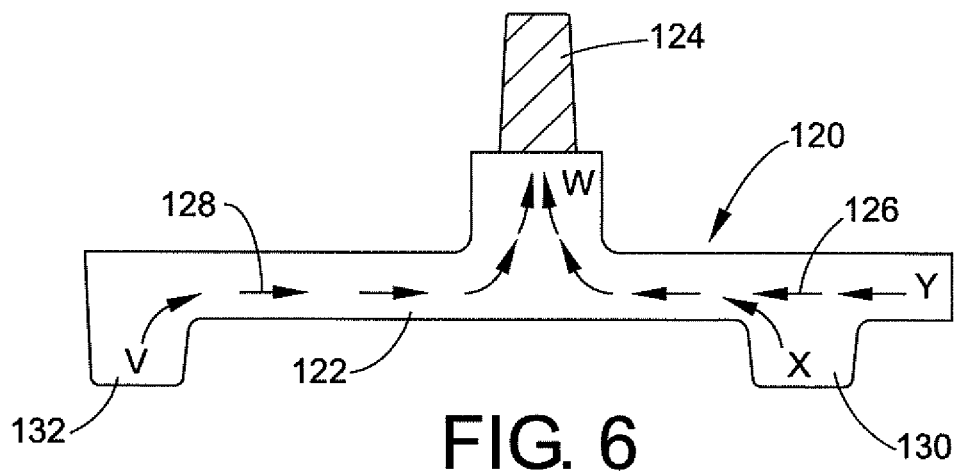
FIG. 6 is a side view of a metal part treated in accordance with the method according to one embodiment of the present disclosure.

With reference now to FIG. 6, a method according to the present disclosure is there illustrated. Ablation is now targeted to ensure excellent properties that are specified for bosses V and X, and intermediate properties for boss W of plate 120 including body 122, Soundness is required for all bosses but for cosmetic reasons feeders are not permitted to be sited on the plate 120. Thus, ablation is targeted at heavy sections 130 and 132. The progress of ablation cooling is shown by the arrows 126 and 128, starting simultaneously at extremities V and Y. The solidification fronts converge on the central boss W on which is planted a feeder 124, Solidification of the casting is now half of that for the prior art shown in FIG. 5. Because of this shortened time, the feeder 124 is especially small and efficient because natural loss of heat has not occurred to such an extent that any significant solidification has occurred in the feeder. Thus, all the liquid in the feeder is available for the feeding of the casting. Feeder 124 can therefore be significantly smaller and more economic than feeder 102 of the prior art, (Even so, of course, both 124 and 102 are considerable improvements on the total of the three feeders required for the casting shown in FIG. 4.) It should be apparent that a vast variety of other casting shapes or geometric designs are contemplated. For many of these, targeted ablation is preferable in order to achieve desired characteristics, production rates and metallurgical properties for the casting.

It should be apparent that a vast variety of casting shapes or geometric designs are contemplated. There can be any number of heavy sections of a metal or metal alloy casting and more than one feeder may sometimes be required depending upon the geometry of the metal casting or part. For many of these casting shapes, components or parts, targeted ablation is preferable in order to achieve desired characteristics, production rates and metallurgical properties for the casting.

The enhanced mechanical properties which can be created in the casting due to targeted ablation result from the removal of the mold from a predetermined area so that the portion of the casting underlying the removed area of the mold can be contacted by the solvent or fluid in order to solidify that portion of the molten metal which is forming the casting. Such enhanced mechanical properties can include greater ultimate strength, higher yield strength, or a larger percentage of elongation before tearing or fracturing and the like. The enhanced mechanical properties can also be that the first portion of the casting comprises dendrites having a dendrite arm spacing which is less than the dendrite arm spacing of the remainder of the casting. The enhanced mechanical properties are the result of the accelerated freezing time, i.e., the solidification time of the molten metal. As the solidification time is reduced, a finer dendrite arm spacing takes place with the refinement of the structure being caused by greatly increasing the cooling rate. As mentioned, with targeted ablation, a higher yield strength in the first portion of a casting or a higher ultimate tensile strength in the first portion of the casting or a greater percentage elongation in the first portion of the casting can be achieved.

It is conceivable that a large proportion of the mold is contacted with the fluid so as to remove that portion of the mold and allow the fluid or solvent to contact the solidifying casting in all portions where the mold has been removed. However, there is at least one portion of the mold which is not removed because it is not contacted by the fluid or because the fluid or solvent does not serve to dissolve that portion of the mold (a metal mold portion, for example). As to that portion of the mold, the casting will have reduced mechanical properties, i.e., a lower yield strength, a lower ultimate tensile strength or a smaller percentage of elongation. It is this remaining portion of the casting which will have reduced mechanical properties. The selected area of the casting having reduced mechanical properties can be designed to be the first portion of the casting to fail.

It should be appreciated, however, that the portion of the casting that is ablated or solidified last does not need to have lower mechanical properties than does the portion which is ablated or solidified first. It depends to a significant extent on the shape of the casting. This occurs because the properties of the casting depend on freezing rate. Thus, if the parts of the casting which were solidified later have very thin sections or are chilled with metal chills, they very likely will have respectable, if not excellent, mechanical properties. However, it is the case that the one or more ablated portions or sections of the casting processed according to the present disclosure will always have superior properties when compared to properties produced by castings solidified conventionally, i.e., by heat loss via conduction to the mold in a conventional mold.

Cast parts which have different mechanical or metallurgical properties in the same part would be useful in a variety of circumstances. Such parts could include, for example, vehicle wheels, structural components for vehicles, such as aircraft or trucks or automobiles, as well as, for example, machine components or parts, as well as structural parts for bridges, buildings, trailers and a variety of large load bearing structures of various sorts. For such parts, it may be desirable to design the cast part so as to have one portion of the part be stronger than another portion of the part in a manner that if the part fails, failure is initiated in a particular portion of the part, even if the part has the same cross-sectional area in the portion of the part designed to fail first as it does in another portion of the part which is designed to resist failure longer than the first portion of the part. Cast parts or components having different mechanical or metallurgical properties can be formed using the targeted ablation process discussed above.

A variety of aluminum alloys can be employed for the cast parts discussed herein. These include the 100-900 series of aluminum alloys, as well as the 1000-8000 series of aluminum alloys. As mentioned, the alloy can be an A356 alloy. It can also be the alloy 6061.

A variety of heat treatments can also be administered to the cast part after the casting process is complete. For example, for A356 aluminum castings, the T5 and T6 heat treatments are possible. In the T5 heat treatment process, the castings are allowed to naturally cool and are then artificially aged at an elevated temperature in a low temperature oven. The T6 heat treatment process constitutes two steps. The castings are first allowed to cool naturally and then heated at an elevated temperature in a high temperature oven. After a set period of time, the castings are quickly quenched. Subsequently, the castings are moved to a low temperature oven for the second step of the T6 heat treatment process.

Needless to say, with other types of aluminum alloys, other heat treatment processes are known in the art.

EXAMPLE II

As an example of the instant disclosure, the manufacture of a 4-cylinder automotive cylinder head cast in A356 Al alloy (nominally Al-7Si-0.4Mg in wt %), is described. A mold was made of a silica sand aggregate bonded with a water-soluble binder such as was described above.

The cylinder head was cast fire face downwards, so that the fire face was formed by the drag portion of the mold.

This facing material of the drag mold included stainless steel shot or other preferably corrosion-resistant particles such as bronze or pure aluminium shot or SIC grains. These chill-inducing materials were bonded with a water-soluble binder. A preferred alternative was a metallic shot or SIC as above (hereinafter conveniently referred to only as 'shot'), but mixed with silica sand or other granular molding aggregate to effectively dilute and control the chilling power of the additive, but all bonded as before with a water-soluble binder.

In one embodiment, the shot (preferably mixed with the sand or other molding aggregate) consists only of a layer between 5 and 10 mm thick at the surface of the mold, so as to chill the fire face of the cylinder head casting. In this way a solid skin of solidified alloy is quickly formed on the important working face of the casting. Within 15 to 30 seconds this skin has strengthened enough to provide a surface against which it is safe to apply ablation water directly. The use of a surface layer of chills has a further incidental benefit, since many customers of cylinder heads specify a fine dendrite arm spacing between the exhaust ports of a 4-valve per cylinder internal combustion engine, particularly the highly stressed diesel engines.

Although it would be possible to make the drag mold with a uniform dispersion of steel shot, or other suitable chill inducing material, this is not usually helpful. A large amount of such chill material will create a cooling effect that is so large that it cannot easily be reversed later so as to obtain the benefit of a reheating phase necessary to effect a solution heat treatment.

The Al alloy (A356) was poured into the mold and allowed to dwell for a period of time (in the region of 30 to 60 seconds depending on the pouring temperature) while the fire face started to solidify by heat extraction from the metallic shot.

Subsequently, water sprays were applied to the base of the mold for approximately 40 seconds to ablate away the drag mold, including the layer containing the metallic shot, thereby allowing direct cooling of the fire face of the casting. This accelerated freezing of the remainder of the partially solidified alloy in contact with the drag creates a particularly fine desired microstructure of the casting in this region.

Subsequently, this rapid cooling by water sprays was interrupted for approximately 75 to 150 seconds to allow the solidified material to reheat, taking heat from those portions of the casting not yet solidified. The temperature of the fire face rose once again to reach approximately 550 C, at which temperature solution occurs rapidly, particularly if the microstructure is fine. Because of the extreme fineness of the microstructure, the solution treatment is extremely fast, requiring only seconds or minutes for a useful degree of solution treatment.

The precise temperature to which the casting reheats is controlled by (i) the amount of chill content of the mold material facing on the drag, (ii) the ablation conditions, and (iii) the ablation interruption period (although it has to be kept in mind that only the latter part of the reheating period does the temperature reach a level for effective for solution treatment). Care has to be taken of course to avoid excess reheating that might cause the fire face to remelt, and thus be vulnerable to damage from subsequent action of water sprays after the end of the cooling interruption period.

The cooling sprays are then re-applied for both the drag and cope portions of the casting to cool and solidify the whole casting, and to remove the mold by dissolving away the water-soluble binder of the aggregate.

The casting was subsequently subjected to an age-only heat treatment for 30 minutes at 175 C in which the fire face increased greatly in strength and hardness, and the remainder of the casting increased sufficiently to meet the specification of the customer.

When first evaluating the required conditions for optimum performance, assessing the percentage of chill material in the facing material of the drag, the ablation conditions and the interruption period, it is most helpful to use a series of sacrificial castings into whose molds holes have been drilled to allow the strategic positioning of fine thermocouples to monitor the cooling and reheating phases, and test the sensitivity of process to changes in the key variables.

Figure 7:
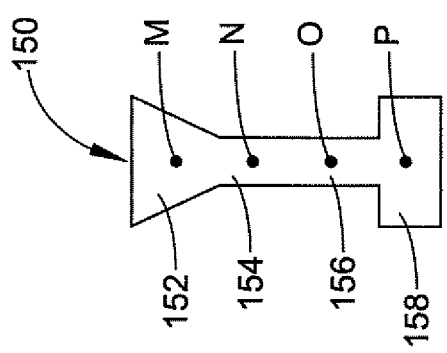
FIG. 7 is a side view of a test specimen treated in accordance with a method of the instant disclosure.

FIG. 7 is a side view of a cast specimen 150 which can be made of 6061 aluminum alloy. It includes a riser 152 in which a thermocouple was placed at point M. An upper middle section 154 of the specimen has a thermocouple placed at point N, with a lower middle section 156 having a thermocouple placed at point O. Finally, a bottom section 158 has a thermocouple placed at point P. The specimen 150 was formed by heating the aluminium alloy to a temperature of about 1350° F. (732° C.) in an electric heated crucible. The alloy was poured into a gravity fed mold which was preheated to about 150° F. (65° C.) and was composed of an aggregate of silica sand having an average grain size of about 250 µm and a binder of phosphate glass. The molten metal for the specimen 150 was poured within ten seconds of removal of the crucible from heat. The fill time of the mold was about two seconds. The diameter of the middle section of this specimen was approximately 20 mm and the length of the specimen was about 120 mm. During pour, the mold was held at a temperature of about 86° F. (30° C.). Immediately after the molten metal was poured, i.e., within two seconds after the mold was filled with the molten metal, a solvent was directed at the base 158 of the mold in order to begin to remove or ablate away the mold.

Figure 8:
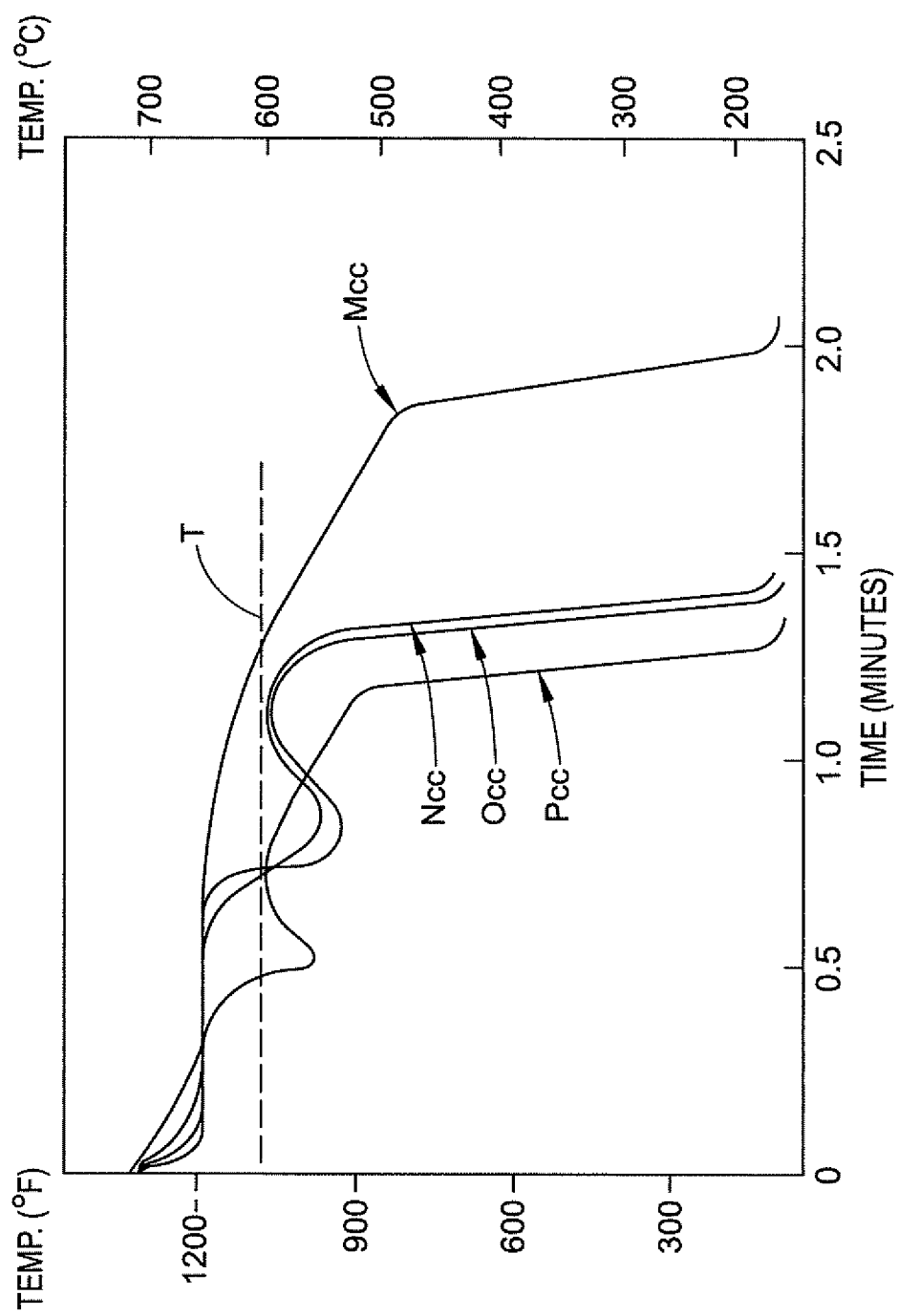
FIG. 8 is a graphical representation of a cooling curve of the test specimen of FIG. 7 illustrating how the specimen cools over time.

FIG. 8 shows the cooling curves generated by the thermocouples at points M, N, O and P in the specimen 150. The cooling curve at point M in the riser 152 is designated as $M_{CC}$, while the curve at point N in the upper middle section 154 of the specimen 150 is designated an $N_{CC}$, the curve at point O in the lower middle section 156 is designated at $O_{CC}$ and the curve at point P in the bottom 158 of the specimen is designated as $P_{CC}$. The temperature curves show that region $P_{CC}$ is cooling first and that the cooling is arrested after reaching a point below line T, i.e., a temperature of about 1100° F. (600° C.). Then, the region $P_{CC}$ is reheated by the adjacent area of the molten metal at $O_{CC}$. A delay in cooling in time and temperature is shown for curve $O_{CC}$, since this region is cooling slower initially. However, the cell or dendrite arm spacing will not appreciably change in size between the $P_{CC}$ location and the $O_{CC}$ location. There might only be about a 5 µm difference. The region $P_{CC}$ is rapidly heating back to the temperature level T and, thus, a short solution is occurring in the region $P_{CC}$.

Cooling by targeted ablation occurs again at location $O_{CC}$ after the given delay between the two curves. Cooling for region $N_{CC}$ has the greatest descent due to higher solid fraction content which has been created by the delay and drops through the level T faster than all other areas. Upon dropping past the temperature T again, cooling is arrested for the location $N_{CC}$. The locations $N_{CC}$ and $O_{CC}$, however, overlap below the temperature T as the adjacent region $N_{CC}$ is heated by the higher heat capacity from the region $M_{CC}$ and overtakes the temperature of the region $O_{CC}$ and reaches a slightly higher temperature.

Finally, at around 1.3 minutes, targeted ablation occurs again, this time between the regions $N_{CC}$ and $O_{CC}$ dropping the cooling quickly. At this time, region $M_{CC}$ is cooling through region $N_{CC}$'s adjacent cross region until finally region $M_{CC}$ is cooled by the fluid at a time of 1.8 minutes. The riser is only cooled prior to this point from the adjacent area $N_{CC}$ that was cooled by the ablating fluid.

It can be seen that stopping a flow of the ablating fluid to a portion of the test specimen 150 will cause that portion to reheat due to the presence of still molten portions in adjacent regions of the specimen. Thus, at least one portion of the component is reheated before the step of removing an adjacent portion of the mold which still contains molten metal at a fairly high temperature.

It should be evident from FIG. 8 that not only is the bottom region 158 reheated, but so too are the lower and upper intermediate regions 156 and 154. In this embodiment, however, the upper region 152 is not reheated in this embodiment of the targeted ablation process.

It is important to note that the line T in FIG. 8 is set to a particular number. In this instance, that number is 1067° F. which is the melting temperature for a generic 6061 aluminum alloy. Thus, the metal that has solidified is allowed to heat up but not melt. It can be seen that the now-solidified metal in sections $P_{CC}$, $O_{CC}$ and $N_{CC}$ in FIG. 7 of the test specimen 150 is allowed to heat up but not to the point where the temperature would pass the melt temperature T of the metal. Cooling of the metal in each of the sections $P_{CC}$, $O_{CC}$ and $N_{CC}$ is arrested for a predetermined period of time. That time period can be on the order of 15 seconds or longer. For section $P_{CC}$, the cooling is arrested at approximately 30 seconds. During that time period, the metal in those sections is heated. Thereafter, cooling is again applied via the contact of the mold with fluid. In this way, targeted areas of the component are cooled at predetermined rates and allowed to heat up, below the melting temperature of the metal of the component, but not past that temperature. Put another way, an indirect cooling of section $O_{CC}$ takes place because section $P_{CC}$ withdraws heat from section $O_{CC}$ as section $P_{CC}$ heats up again. Similarly, section $O_{CC}$ withdraws heat indirectly from section $N_{CC}$ as section $O_{CC}$ heats up again.

The line T represents a temperature at which all solute reactions have taken place and the solute elements are frozen for a given metal or metal alloy. It is understood in the art that line T represents the highest temperature that an alloy can achieve upon a thermal treatment before incipient melting takes place in the alloy, which can lead to reduced mechanical properties. Such reduced properties should be avoided. It should also be noted that the temperature represented by line T is not a fixed or exact temperature for the given metal which is being solidified, since the line T represents a temperature which is a melting point of a metal alloy and is dependent upon the microstructure, alloy concentration, and solute elements within regions of the solidified metal. It should also be appreciated that as the solidified metal approaches the temperature T and stays near that temperature for a given time, thermal treatment begins for most metals.

The temperature chart of FIG. 8 is achieved by a configuration of fluid nozzles, including one which is directed at section $N_{CC}$ and turns on at about 0.1 minute (6 seconds). Initially, a nozzle directed at section $P_{CC}$ turns on. The nozzle at $P_{CC}$ is subsequently turned off and cooling of section $P_{CC}$ is arrested at about 0.5 minutes, i.e., 30 seconds. When the nozzle at $N_{CC}$ is turned on, it can be seen that the temperature of sections $N_{CC}$ and $O_{CC}$ begins to decrease and the temperatures of these sections cross the temperature of section $P_{CC}$, which has heated up in the meantime. Then, the nozzle at $N_{CC}$ is turned off and sections $N_{CC}$ and $O_{CC}$ are subsequently heated up. However, during this time period, the nozzle at section $P_{CC}$ is again turned on and as can be seen, the temperature in section $P_{CC}$ begins to decrease again and crosses the temperature lines for sections Nee and $O_{CC}$ as a result. If desired, the nozzle at $N_{CC}$ can again be turned on.

Figure 9:
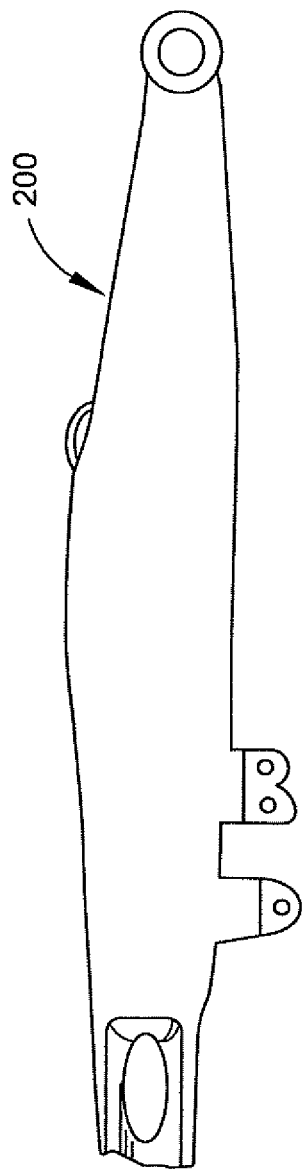
FIG. 9 is a side elevational view of a swing arm for a motorcycle manufactured according to the present disclosure.
Figure 10:
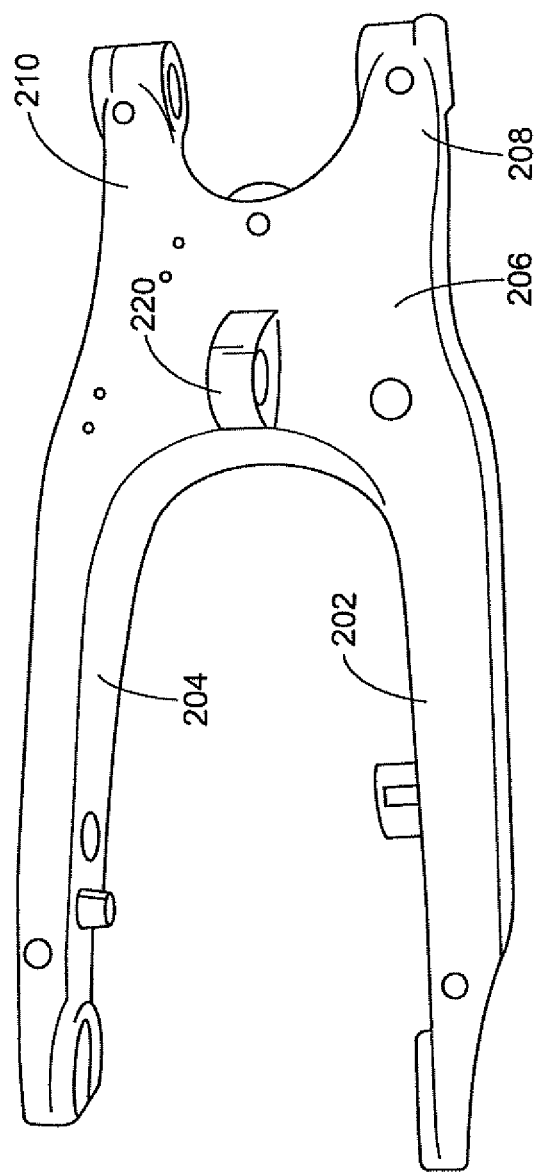
FIG. 10 is a top plan view of the swing arm.

With reference now to FIGS. 9 and 10, illustrated there is a motorcycle swing arm 200 which includes first and second legs 202 and 204 extending axially in a first direction from a body section 206 and third and fourth legs 208 and 210 extending axially in a second direction from the body section. It should be appreciated that at least the legs 202 and 204 are hollow. In fact, the entire swing arm can be hollow to save weight. The walls of the hollow swing arm are 2.5 to 3 mm thick. Protruding upwardly from the body section 206 is a solid boss 220. It can be seen that a relatively thick boss is planted in the middle of the swing arm. In one embodiment, the boss does not have its own feeder to feed it molten metal. Nevertheless, the thick section in the region of the boss is solidified or frozen first. This is done via feed of a molten metal from the relatively thinner sections of the swing arm to the relatively thicker boss. Targeted ablation enables such a component to be manufactured from molten metal. In this embodiment, the boss is designed to have the highest material properties. More particularly, the swing arm as manufactured from a 6061 aluminum alloy has in the region of the boss an ultimate tensile strength of about 50 KSI, a 0.2% offset yield strength of about 45 KSI, and an elongation of about 15 percent. The remaining sections of the swing arm have lower properties, for example, about 3 to 4 percent less elongation, i.e., about 11 percent elongation or so for the remainder of the swing arm and a 0.2% offset yield strength of about 42 KSI.

As to the swing arm, it could not be manufactured or produced via regular ablation. The reason for this is that the walls in the hollow swing arm are only 2.5 to 3 mm thick and the boss was fed molten metal through the thin sections. In conventional ablation, the molten metal would never reach the boss, located in the middle of the swing arm, in time. The boss had to solidify in less than 16 seconds or the adjacent thin walled areas could not feed the boss. Thus, the swing arm could not be manufactured employing the process of the '691 patent.

Figure 11:
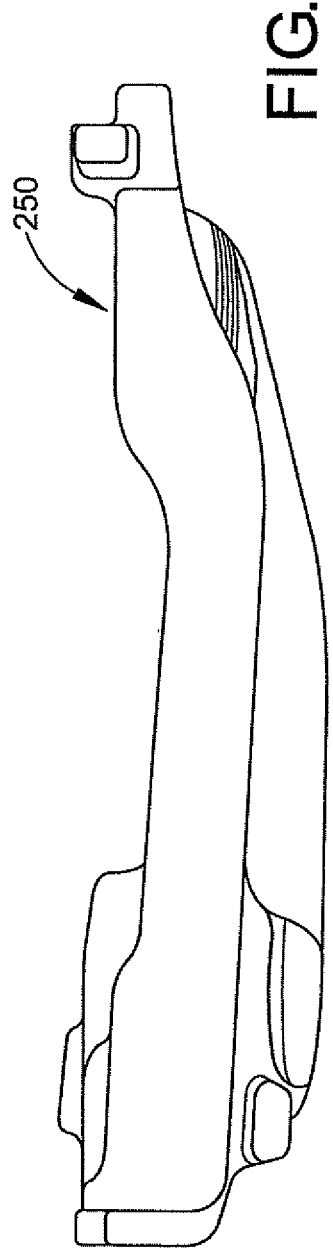
FIG. 11 is a top plan view of a transom bracket for a boat outboard motor manufactured according to the present disclosure.
Figure 12:
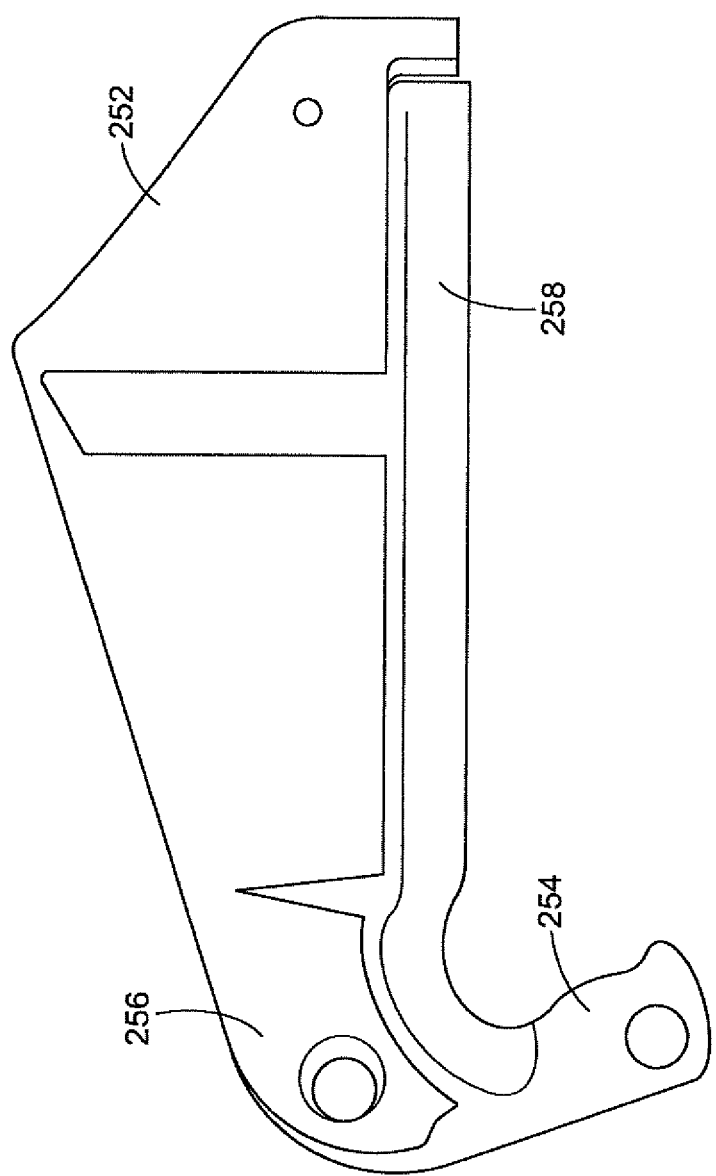
FIG. 12 is a side elevational view of the transom bracket.

With reference now to FIG. 11, disclosed is a transom bracket 250 for an outboard motor for a boat or the like. The transom bracket was made from a 6061 aluminum alloy and includes a base section 252, an arm 254 which extends in a direction approximately normal to the longitudinal direction of the base and a connecting section or neck 256. The connecting section or neck is thick, being about 3 inches in thickness. The neck is a 90 degree bent region 256 which is over 75 mm or 3 inches in thickness. It is highly desirable that the transom bracket not fail in this region. Prior art manufacturing of the necked region cast in A356 alloy has an elongation of not more than 2 percent and takes over 10 minutes to solidify in a low pressure permanent mold die. For the prior art, the 0.2% offset yield strength is around 25 KSI and the ultimate tensile strength is around 34 KSI.

On the other hand, using targeted ablation to manufacture this component results in mechanical properties which include an elongation of about 10 percent in the neck region of the transom bracket with the 0.2% offset yield strength being at 36 KSI and the ultimate tensile strength being at 44 KSI in this region. Other regions along the base 252 of the housing are designed to have material properties that can be lower so that if failure is to occur, the component will show cracking along a back spline 258. However, it is desirable to have no failure occur in this product. The thicker region 256 has higher ultimate yield strength in comparison to the other regions of the transom bracket 250 because this is designed to be the last region to fail. The transom bracket can be manufactured either from a 6061 aluminum alloy or an A356 aluminum alloy and both alloys provide similar ultimate yield strengths and ultimate tensile strengths, as well as a percent of elongation when produced by targeted ablation.

In conventional ablation, the thin sections have better material properties because they are being fed from thicker regions of the molten metal housed in the mold because the solid fraction to feed take longer to reach a critical non-feeding point. The remaining liquid alpha phase in the thicker regions flows to the areas that are thinner. For the transom bracket in particular, the region in the neck is 75 mm or 3 inches thick and the surface area to remove energy by other casting processes cannot occur. In ablation, the cross section area is removing the energy that casting processes, which conventionally remove energy from the surface, cannot obtain the cooling rate to overcome this thick region despite all attempts to do so by a metal chill, water chilling the tooling, die casting the part, and other such known casting processes. These material properties can only be achieved in the neck region by a forged component.

The regular ablation taught in the '691 patent could not be employed to manufacture such a transom bracket. In other words, targeted ablation as disclosed herein had to be deployed so that the thick region of the neck 256 could be formed ahead of the thinner regions. It should be appreciated that the neck 256 did not have a feeder or riser connected directly to it. Instead, a feeder or riser was planted on the back spline 258 as it tapers to the reduced section opposite the 90 degree neck region.

Figure 13:
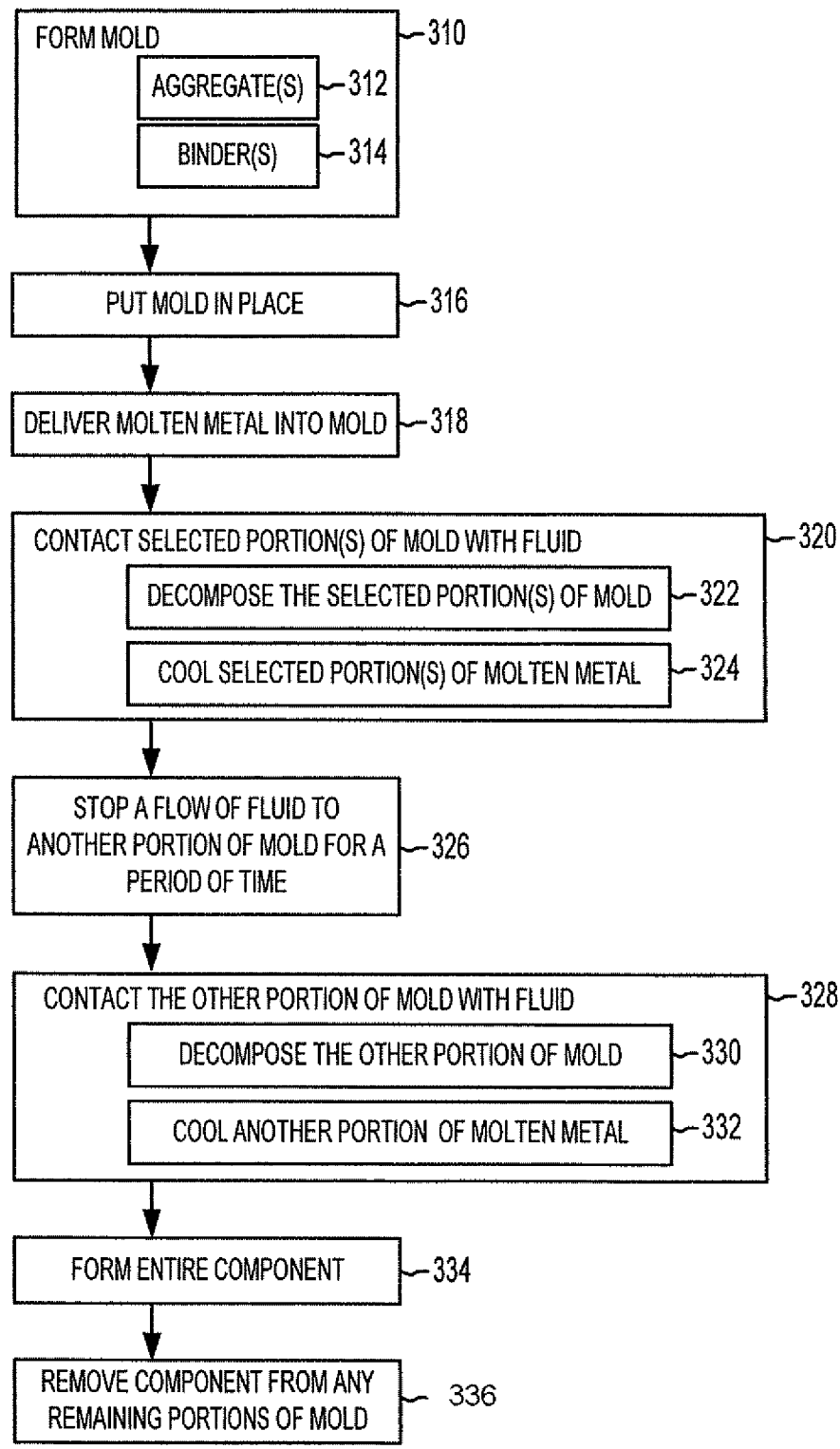
FIG. 13 is a flow chart of the steps associated with another embodiment of a method according to the present disclosure.

Referring now to FIG. 13, this figure illustrates the steps of a process according to another embodiment of the present disclosure. The first step in the process is to form a mold as shown in block 310. The mold comprises one or more aggregates 312 and one or more binders 314. Once the mold is formed, it is put in place as at step 316 so that it may be filled with a molten metal. The molten metal is then delivered into the mold at step 318. The mold may be designed to allow the molten metal to be delivered according to any of the methods described herein. The mold is then subjected to the action of or contacted by a fluid or solvent, such as at 320. During this process, one or more selected portions of the mold are decomposed as at 322 and one or more selected portions of the molten metal are cooled as at 324. While one portion or selected portions of the mold are being decomposed so that the fluid or solvent contacts the underlying molten metal to cool same and solidify same, thereby giving it different mechanical or metallurgical properties from the remainder of the molten metal which is to be formed in the mold, the other portions of the molten metal contained in the mold may be cooled at a different rate or not cooled at all, i.e., the cooling can be arrested thereby giving different properties to the remaining portions of the component which is to be eventually formed in the mold.

In this embodiment, the flow of fluid to another portion of the mold is stopped for a period of time as at 326. As noted above, the selected portion(s) of the mold could then actually be heated again. Subsequently, or at a later point in time, the other portion or portions of the mold are again contacted with a fluid as at 328 and one or more other portions of the mold are then decomposed as at 330. The other portions of the molten metal are then cooled as at 332. Thereafter, the entire component is formed as at 334 and the component is subsequently removed from any remaining portions of the mold as at 336.

Figure 14:
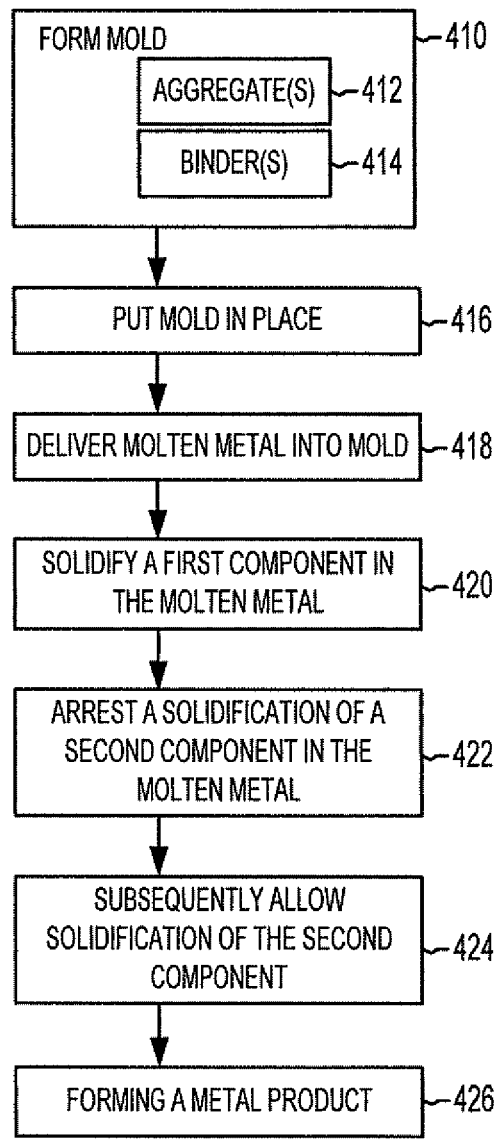
FIG. 14 is a flow chart of the steps associated with still another embodiment of a method according to the present disclosure.

With reference now to FIG. 14, still another embodiment of the present disclosure comprises a method for forming a mold in which a mold is formed as at block 410 with the mold including one or more types of aggregates as at block 412 and one or more types of binders as at block 414. The mold is then put in place as at block 416 and a molten metal is delivered to the mold as at block 418. Thereafter, a first component in the molten metal is solidified as at block 420. A solidification of a second component in the molten metal is however arrested as at block 422, Subsequently, i.e., thereafter in time by some predetermined time period, a solidification is allowed of the second component in the molten metal as at 424. Thereafter, a metal product or component is formed as at 426.

Figure 15:
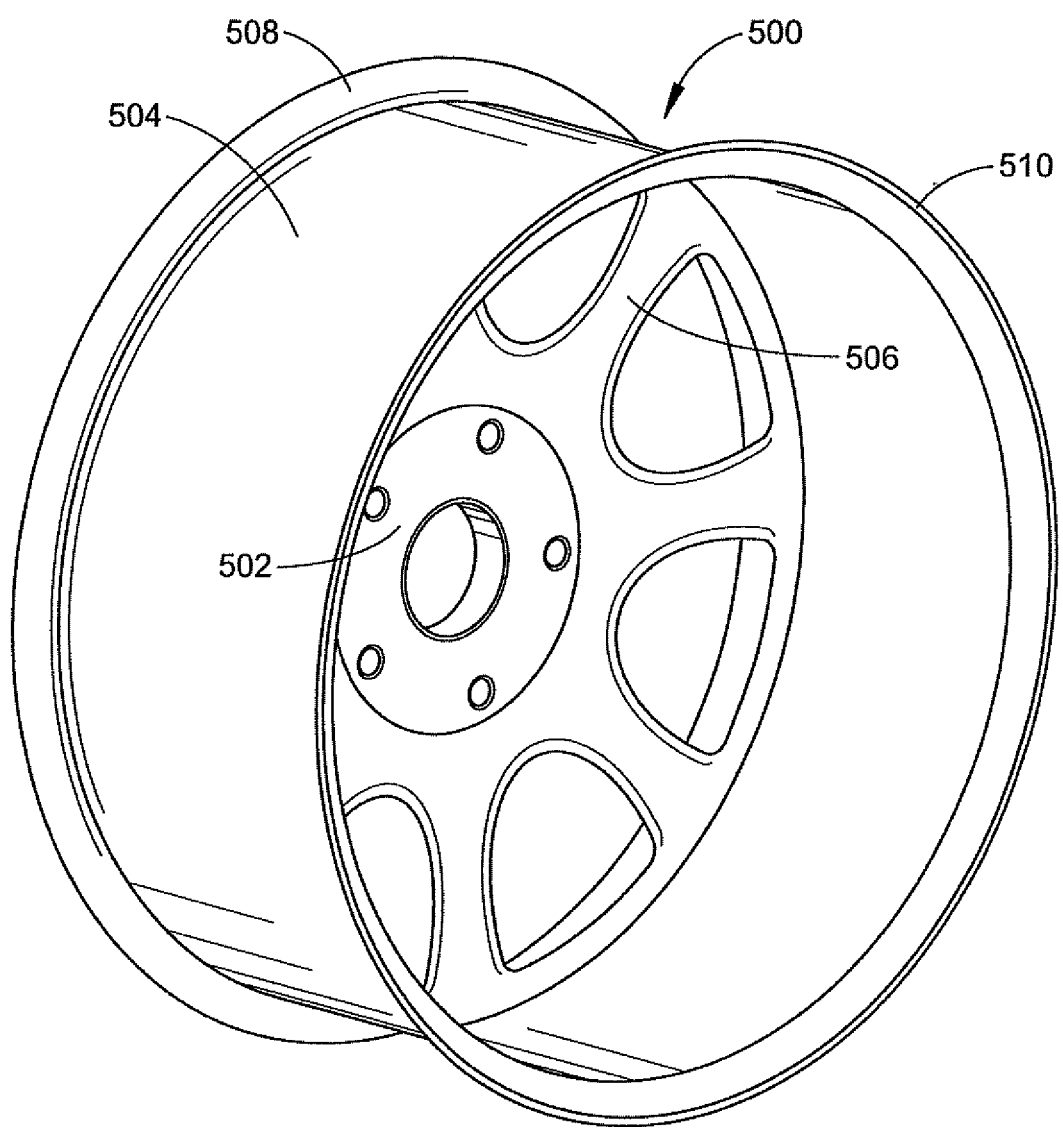
FIG. 15 is a perspective view of a vehicle wheel treated in accordance with a method according to one embodiment of the present disclosure.

In a yet further embodiment, the component can be formed as a metal vehicle wheel, such as, for example, from an aluminum alloy. With reference to FIG. 15, a vehicle wheel 500 has an inner hub 502, an outer rim 504 and one or more spokes 506 which connect the hub 502 and the rim 504 to each other. The rim 504 can include a pair of spaced bead seats 508 and 510 which are adapted or configured to cooperate with a tire in order to facilitate an effective airtight seal for the tire. Targeted ablation may be useful for the manufacture of such vehicle wheels. In one embodiment, the spokes 506 are hollow and targeted ablation has proven particularly useful in the manufacture of such hollow spoked wheels.

Figure 17:
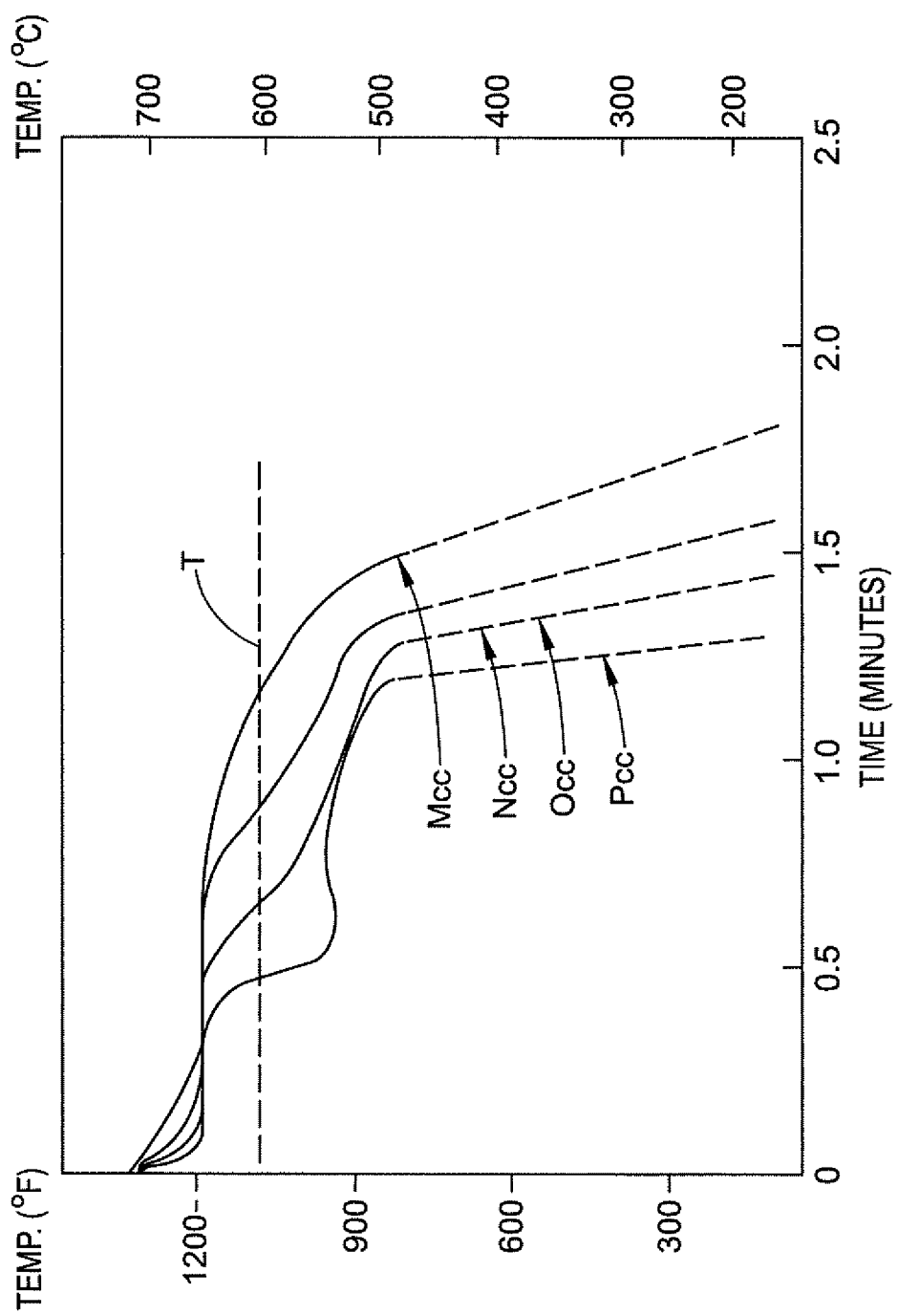
Figure 16:
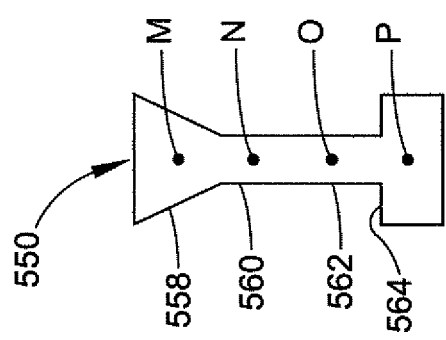
FIG. 16 is a side view of another test specimen treated in accordance with a method of the instant disclosure; and, FIG. 17 is a graphical representation of a cooling curve of the test specimen of FIG. 16 illustrating how the specimen cools over time.

With reference now to FIG. 16, it is a side view of a cast specimen 550 which can be made of a 6061 aluminum alloy. It includes a riser 558 in which a thermocouple was placed at point M, an upper middle section 560 that has a thermocouple placed at point N and a lower middle section 562 in which a thermocouple was placed at point O. Finally, a bottom section 564 has a thermocouple placed at point P. As shown in FIG. 17, in this embodiment, cooling begins at section $P_{CC}$ and that section is solidified. The cooling at section $P_{CC}$ is subsequently arrested at about 30 seconds. Section $O_{CC}$ is acted upon by the adjacent section $P_{CC}$ which serves as a solid chill and has a heat capacity no different than a metal chill used conventionally in a sand cast core mold. However, the chill exerted by section $P_{CC}$ on section $O_{CC}$ is continuous in that it is a solid chill without an air gap, since metallurgically, it is atomically bonded at the solid-to-liquid interface. Cooling rates vary across the length of the specimen 550, as the chilled section $P_{CC}$ heats up (note the rise in temperature of section $P_{CC}$) and exerts a cooling action with a temperature gradient extending into sections $O_{CC}$, $N_{CC}$ and even $M_{CC}$. The temperature gradient can be seen as the sections exit from the eutectic and each successive location has a slower cooling rate as the distance of that section increases from section $P_{CC}$. At approximately 1.2 minutes, cooling is applied again at section $P_{CC}$. Locations at sections $O_{CC}$, $N_{CC}$ and $M_{CC}$ are then cooled with a temperature gradient that happens to start after all the sections are solidified. This cooling could be referenced as a quench in a thermal treatment. Depending on the alloy, various post thermal treatments can occur and the quench is represented by the dashed lines.

The targeted ablation process described herein is applicable to the manufacture of many alloy systems, but in particular is expected to be especially suitable for non-ferrous alloys based on magnesium, aluminum and copper. However, it will be clear that the process is also applicable to ferrous alloys and other high temperature alloys such as nickel-based and similar alloy systems. This disclosure describes a particular application to aluminum alloys. It should be appreciated however that various metals can be employed according to the present disclosure. These include a large variety of metals and alloys, such as the ones described above.

The ablation technique is an attractive and relatively low-cost process for the manufacture of shaped castings of unique soundness and high properties, by a process that is environmentally friendly, evolving neither fume nor smell, and in which all production materials (aggregate, binder, and a solvent, such as water) may be disposed of benignly or can be internally recycled.

The instant disclosure has been described with reference to several preferred embodiments. Obviously, modifications and alterations will occur to others upon reading and understanding the preceding detailed description. It is intended that the instant disclosure be construed as including all such modifications and alterations insofar as they come within the scope of the appended claims or the equivalents thereof.

What is claimed is:

1. A process for manufacture of metal products from metal alloys, comprising the steps of:
   providing a mold including a first portion comprising an aggregate and a binder;
   delivering a molten metal alloy into the mold;
   removing at least a portion of the first portion of the mold with a fluid;
   solidifying a targeted portion of the molten metal alloy into a first solid metal portion;
   stopping a flow of fluid to the mold for a period of time;
   subsequently resuming a flow of fluid to the mold;
   solidifying a remaining portion of the molten metal alloy to form a metal product; and,
   wherein the first solid metal portion of the metal product has better mechanical properties including at least one of a higher yield strength, a higher ultimate tensile strength, and an enhanced elongation to failure than are the mechanical properties of a remaining portion of the metal product due to an increased cooling rate of the targeted portion of the molten metal alloy in comparison to a remainder of the molten metal alloy.

2. The process of claim 1, wherein the steps of removing at least a portion of the mold and solidifying the targeted portion of the molten metal alloy are performed approximately simultaneously.

3. The process of claim 1, further comprising providing a metal section for the mold and cooling the molten metal alloy with the metal section of the mold.

4. The process of claim 1, wherein the step of removing the first portion of the mold with a fluid includes the step of spraying the mold with a solvent.

5. The process of claim 1, further comprising subsequently removing a second portion of the mold with the fluid.

6. The process of claim 1, further comprising arresting a cooling of the first solid metal portion for a predetermined period of time.

7. The process of claim 1, further comprising solidifying a selected first component of the molten metal alloy and arresting a solidification of a second component of the molten metal alloy.

8. A process for manufacture of metal products from metal alloys, comprising the steps of:
    providing a mold including a first portion comprising an aggregate and a binder;
    delivering a molten metal alloy into the mold;
    removing at least a portion of the first portion of the mold with a fluid;
    solidifying a targeted portion of the molten metal alloy into a first solid metal portion;
    stopping a flow of fluid to the mold for a period of time;
    subsequently reheating the first solid metal portion to a temperature less than the melt temperature of the metal alloy;
    resuming a flow of fluid to the mold;
    solidifying a remaining portion of the molten metal alloy to form the metal product; and,
    wherein the first solid metal portion of the metal product has better mechanical properties including at least one of a higher yield strength, a higher ultimate tensile strength, and an enhanced elongation to failure than are the mechanical properties of a remaining portion of the metal product due to an increased cooling rate of the targeted portion of the molten metal alloy in comparison to a remainder of the molten metal alloy.

9. The process of claim 8, including the step of reducing at least one of internal stress and distortion in the first solid metal portion.

10. The process of claim 8, wherein the steps of removing at least a portion of the mold and solidifying the targeted portion of the molten metal alloy are performed approximately simultaneously.

11. The process of claim 8, further comprising providing a metal section for the mold and cooling the molten metal alloy with the metal section of the mold.

12. The process of claim 8, wherein the step of removing the first portion of the mold with a fluid includes the step of spraying the mold with a solvent.

13. The process of claim 8, further comprising subsequently removing a second portion of the mold with the fluid.

14. The process of claim 8, further comprising arresting a cooling of the first solid metal portion for a predetermined period of time before the step of subsequently reheating the first solid metal portion.

15. The process of claim 8, further comprising solidifying a selected first component of the molten metal alloy and arresting a solidification of a second component of the molten metal alloy.

16. A process for manufacture of metal products from metal alloys, comprising the steps of:
    providing a mold including a first portion comprising an aggregate and a binder;
    delivering a molten metal alloy into the mold;
    removing at least a portion of the first portion of the mold with a fluid;
    cooling at least one targeted portion of the molten metal alloy via the fluid;
    solidifying the at least one targeted portion of the molten metal alloy into a first solid metal alloy portion;
    shutting off a flow of the fluid;
    cooling a remaining portion of the molten metal alloy in the mold via the first solid metal alloy portion;
    reheating the first solid metal alloy portion to a temperature below its melt temperature; and
    subsequently resuming a cooling of the first solid metal alloy portion.

17. The process of claim 16 further comprising the step of thermal treatment of the first solid metal alloy portion during the step of reheating the first solid metal alloy portion.

18. The process of claim 16 further comprising reducing at least one of internal stress and distortion in the first solid metal alloy portion.

19. The process of claim 16 wherein the step of removing the at least a portion of the first portion of the mold with a fluid includes the step of spraying the mold with a solvent.

20. The process of claim 16 wherein the step of subsequently resuming the cooling of the first solid metal alloy portion includes resuming the flow of fluid to the mold.

21. A process for manufacture of metal products from metal alloys, comprising:
    providing a mold including an aggregate and a binder;
    delivering a molten metal alloy to a mold cavity in the mold;
    removing a portion of the mold;
    solidifying a targeted portion of the molten metal alloy in the mold cavity into an initial solid metal portion;
    interrupting a cooling of the initial solid metal portion for a dwell period;
    subsequently resuming a cooling of the initial solid metal portion;
    solidifying a remaining portion of the molten metal alloy to form a metal product;
    wherein the initial solid metal portion of the metal product has better mechanical properties, including at least one of a higher yield strength, a higher ultimate tensile strength and an enhanced elongation to failure than are the mechanical properties of a remaining portion of the metal product due to an increased cooling rate of the initial solid metal portion in comparison to a remainder of the metal product.

22. The process of claim 21 further comprising reheating the initial solid metal portion to a temperature below its melt temperature before the step of subsequently resuming a cooling of the initial solid metal portion.

* * * * *